United States Patent
Murao et al.

(10) Patent No.: US 10,241,341 B2
(45) Date of Patent: Mar. 26, 2019

(54) STEREOSCOPIC DISPLAY DEVICE

(71) Applicant: Sharp Kabushiki Kaisha, Osaka-shi, Osaka (JP)

(72) Inventors: Takehiro Murao, Osaka (JP); Takuto Yoshino, Osaka (JP); Hiroshi Fukushima, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 74 days.

(21) Appl. No.: 14/889,531

(22) PCT Filed: Feb. 25, 2014

(86) PCT No.: PCT/JP2014/054458
§ 371 (c)(1),
(2) Date: Feb. 12, 2016

(87) PCT Pub. No.: WO2014/181567
PCT Pub. Date: Nov. 13, 2014

(65) Prior Publication Data
US 2016/0195731 A1     Jul. 7, 2016

(30) Foreign Application Priority Data
May 9, 2013  (JP) ................. 2013-099118

(51) Int. Cl.
*G02F 1/13*     (2006.01)
*G02B 27/22*   (2018.01)
(Continued)

(52) U.S. Cl.
CPC ....... *G02B 27/2214* (2013.01); *G02F 1/1323* (2013.01); *G02F 1/1347* (2013.01);
(Continued)

(58) Field of Classification Search
CPC ... G02B 27/2214; G02F 1/1347; G03B 35/24; H04N 13/0409; H04N 13/0477; G09G 3/3614

See application file for complete search history.

(56) References Cited

U.S. PATENT DOCUMENTS

2007/0183015 A1* 8/2007 Jacobs .................. G02F 1/1323
                                                              359/245
2011/0032441 A1* 2/2011 Robinson .......... G02F 1/133621
                                                              349/33
(Continued)

FOREIGN PATENT DOCUMENTS

JP        2013-024957 A    2/2013

*Primary Examiner* — Michael H Caley
*Assistant Examiner* — Jonathan Y Jung
(74) *Attorney, Agent, or Firm* — Keating & Bennett, LLP

(57) ABSTRACT

Obtained is a configuration of a stereoscopic display device wherein luminance variation and increase of crosstalk can be reduced over a period before and after the switching of the parallax barrier. The stereoscopic display device includes: a display panel for displaying an image with a plurality of pixels; a switch liquid crystal panel that is arranged so as to be stacked on the display panel; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, with use of a predetermined barrier switching pitch as a minimum unit, and causing the switch liquid crystal panel to display the parallax barrier. The plurality of pixels have openings each of which has a width A in the alignment direction, the width A satisfying the expressions of $A \leq Wsl-2Pe$, and $A \leq Wbr-2Pe$ where Wsl is a width of the (Continued)

transmitting region, Wbr is a width of the non-transmitting region BR, and Pe is the barrier switching pitch.

10 Claims, 31 Drawing Sheets

(51) Int. Cl.
H04N 13/31 (2018.01)
G02F 1/1347 (2006.01)
G03B 35/24 (2006.01)
H04N 13/04 (2006.01)
G02F 1/29 (2006.01)

(52) U.S. Cl.
CPC ............ G02F 1/292 (2013.01); G03B 35/24 (2013.01); H04N 13/0409 (2013.01); H04N 13/0477 (2013.01); H04N 13/31 (2018.05)

(56) References Cited

U.S. PATENT DOCUMENTS

| | | | |
|---|---|---|---|
| 2011/0304612 A1* | 12/2011 | Ohyama | G02B 27/2214 345/419 |
| 2012/0013606 A1* | 1/2012 | Tsai | G02B 27/2214 345/419 |
| 2013/0127842 A1* | 5/2013 | Lee | G06T 15/00 345/419 |
| 2013/0176619 A1* | 7/2013 | Hoshino | G02B 27/2214 359/463 |
| 2013/0241922 A1* | 9/2013 | Kim | G09G 3/003 345/419 |
| 2013/0335648 A1* | 12/2013 | Kuroda | G02F 1/13306 349/15 |

* cited by examiner

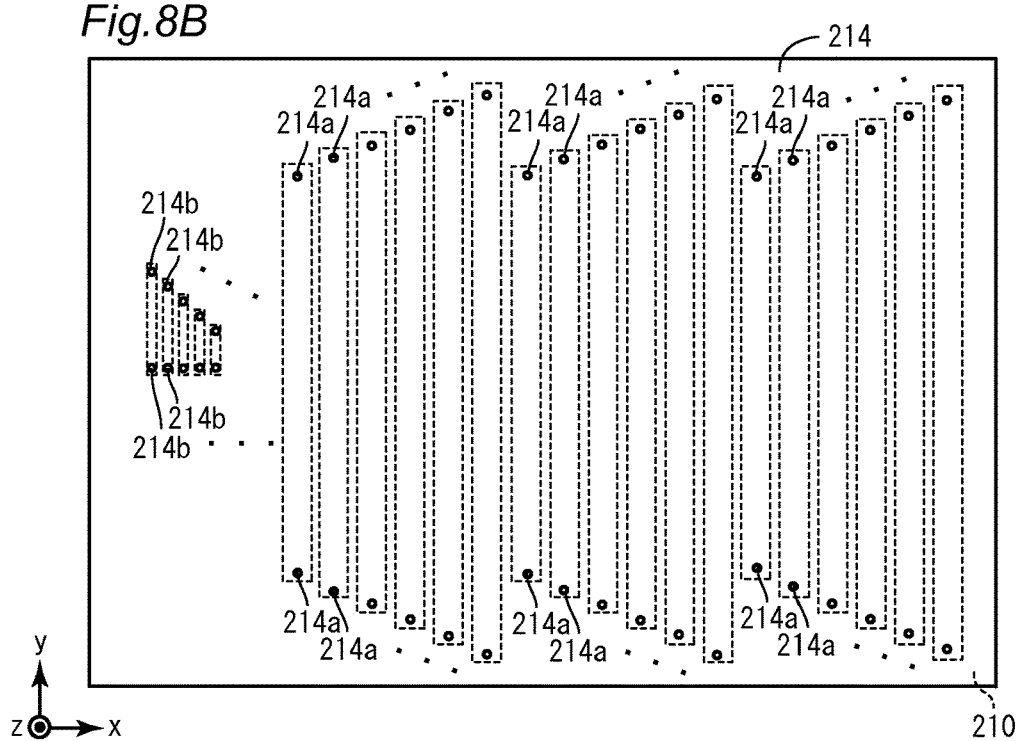
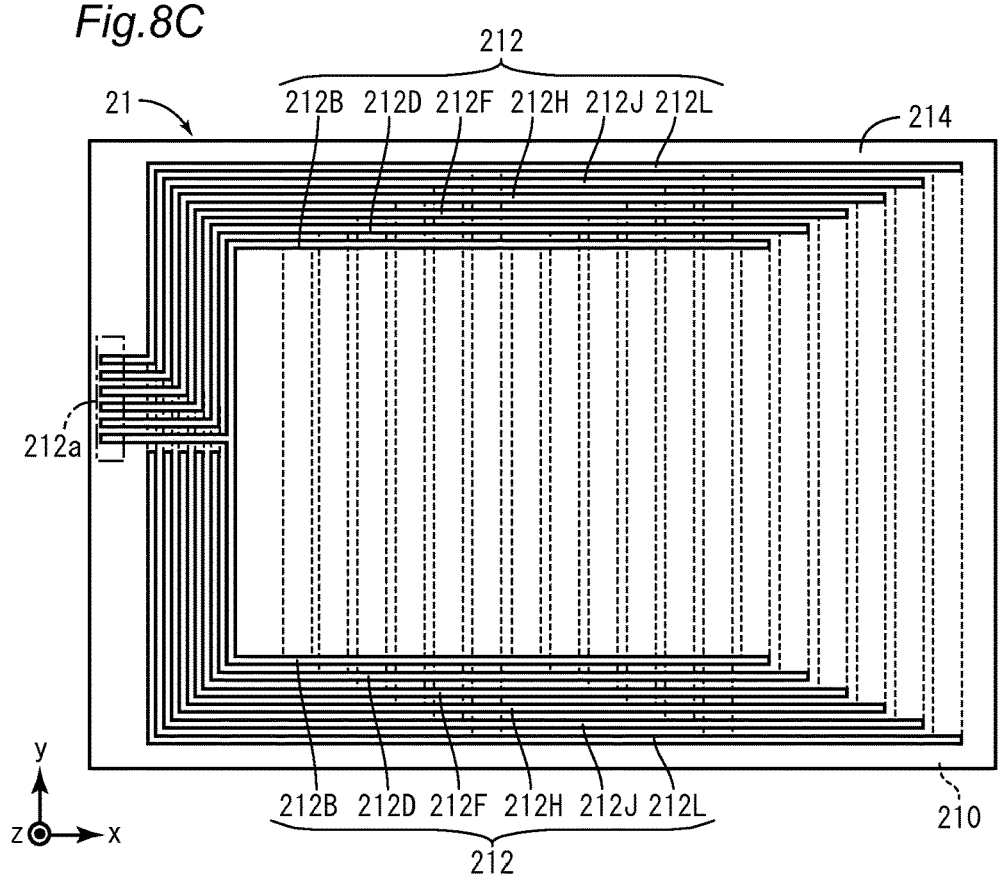

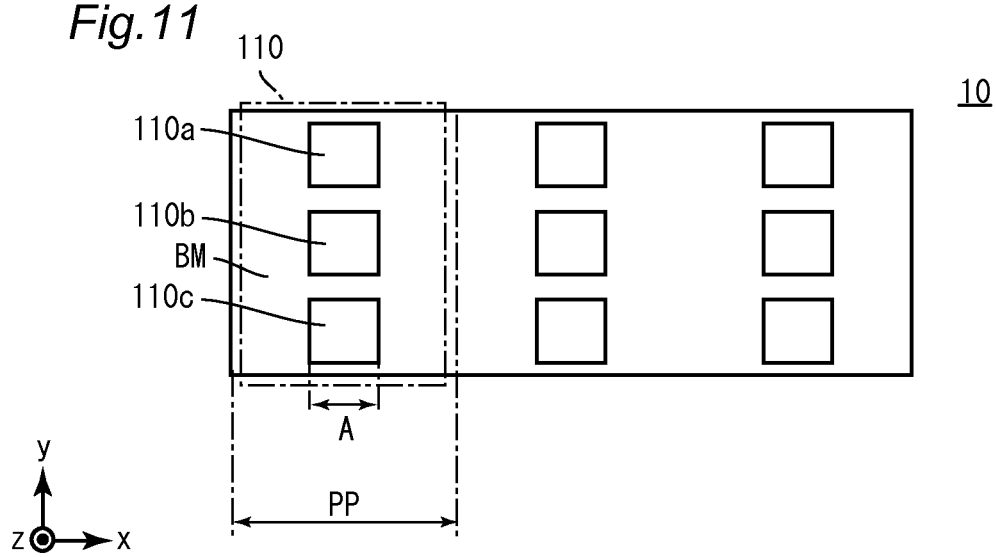
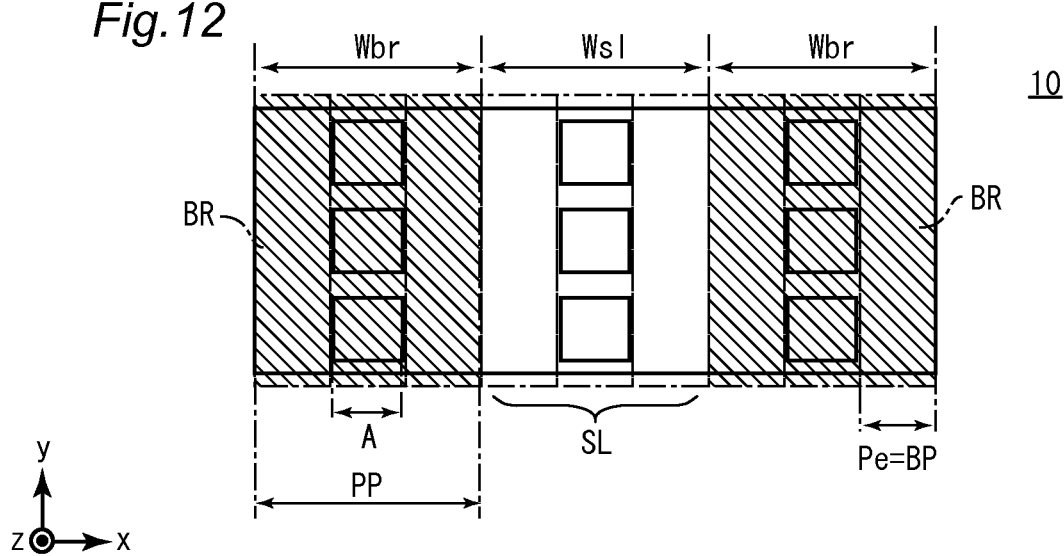

STEREOSCOPIC DISPLAY DEVICE

TECHNICAL FIELD

The present invention relates to a naked-eye stereoscopic display device.

BACKGROUND ART

As a stereoscopic display device that can be viewed with naked eyes, those of a parallax barrier type and a lenticular lens type are known. The stereoscopic display devices of these types separate light using barriers or lenses, and cause different images to be visible to the right and left eyes, respectively, so as to provide a stereoscopic vision to the viewer. In recent years, main types of naked-eye stereoscopic display devices that are in the market are those of the two-viewpoint parallax barrier type and those of the lenticular lens type.

In the case of such a two-viewpoint stereoscopic display device, excellent stereoscopic display can be achieved from a predetermined region, but there also exists the following region: when a viewer moves the head to the region, a so-called crosstalk occurs, which is such a phenomenon that an image to be visible to the right eye and an image to be visible to the left eye are mixed and viewed as a double image, or a state of a so-called pseudoscopic vision occurs, which is such a phenomenon that an image to be visible to the right eye is visible to the left eye. Therefore, only from a limited region, a viewer can view stereoscopic images. To address this problem, the multiple-viewpoint technique, the tracking technique of detecting the position of the head of a viewer and displaying an image according to the position, and the like have been proposed.

Further, a technique of a switch liquid crystal display (SW-LCD) of a barrier division type has been proposed, wherein a parallax barrier is formed with a liquid crystal panel and is moved according to the position of a viewer. In the case of the SW-LCD technique, if conditions for the parallax barrier formation and the like are not appropriate, changes of luminance and increase of crosstalk occur upon the switching of the parallax barrier, in some cases.

JP2013-24957A discloses a display device that includes: a display panel on which pairs of subpixels are arrayed in a lateral direction; and a parallax barrier shutter panel on which sub-openings whose light transmitting state and light blocking state can be switchable are arrayed in the lateral direction. In this display device, among a plurality of sub-openings corresponding to a reference parallax barrier pitch, an arbitrary number of adjacent sub-openings are turned to be in the light transmitting state, and the other sub-openings are turned to be in the light blocking state, whereby integrated openings obtained are formed in the parallax barrier shutter panel. Then, the sub-opening pitch is equal to or smaller than the difference between the width of the subpixel and the width of the integrated opening.

DISCLOSURE OF THE INVENTION

With the display device disclosed in JP2013-24957A, excellent quality can be obtained if there is no delay time upon the parallax barrier switching. Actually, however, there is a delay time due to the response speed of liquid crystal, which causes changes of luminance and increase of crosstalk, in some cases.

An object of the present invention is to obtain a configuration of a stereoscopic display device wherein luminance variation and increase of crosstalk can be reduced over a period before and after the switching of the parallax barrier.

The stereoscopic display device disclosed herein includes: a display panel for displaying an image with a plurality of pixels; a switch liquid crystal panel that is arranged so as to be stacked on the display panel; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, with use of a predetermined barrier switching pitch as a minimum unit, and causing the switch liquid crystal panel to display the parallax barrier. The plurality of pixels have openings each of which has a width A in the alignment direction, the width A satisfying the following expressions:

$$A \leq Wsl - 2Pe, \text{ and}$$

$$A \leq Wbr - 2Pe$$

where Wsl is a width of the transmitting region, Wbr is a width of the non-transmitting region, and Pe is the barrier switching pitch.

According to the present invention, a stereoscopic display device can be obtained wherein luminance variation and increase of crosstalk can be reduced over a period before and after the switching of the parallax barrier.

BRIEF DESCRIPTION OF DRAWINGS

FIG. 8B is a view for explaining an exemplary method for producing the first substrate.

FIG. 8C is a view for explaining an exemplary method for producing the first substrate.

FIG. 11 is a plan view for explaining a configuration of a pixel of a display panel.

FIG. 12 schematically illustrates the relationship between the pixels, and barriers and slits formed by the switch liquid crystal panel.

EMBODIMENTS FOR CARRYING OUT THE INVENTION

Figure 1:
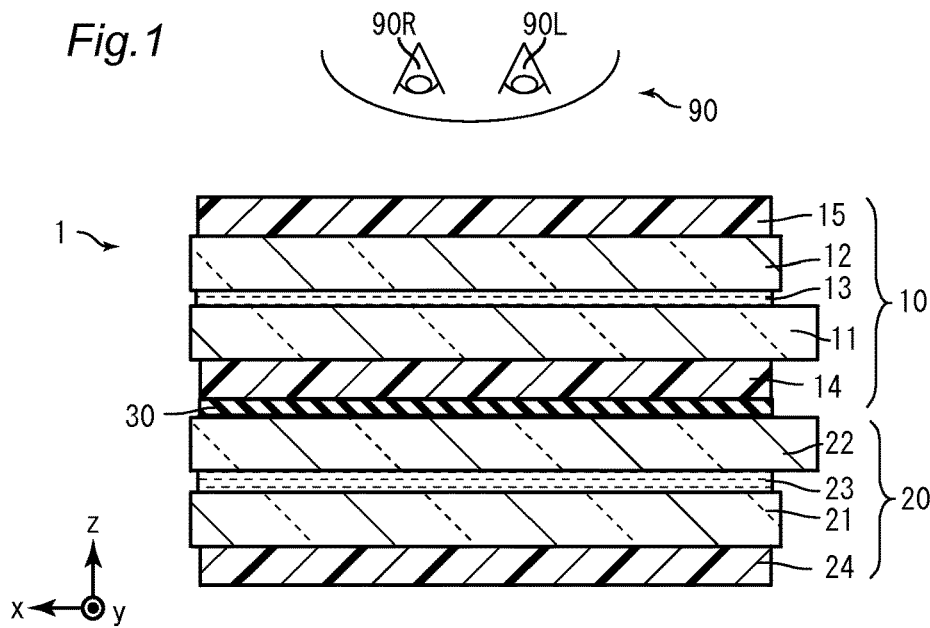
FIG. 1 is a schematic cross-sectional view illustrating a configuration of a stereoscopic display device according to the First Embodiment of the present invention.

The stereoscopic display device according to one embodiment of the present invention includes: a display panel for displaying an image with a plurality of pixels; a switch liquid crystal panel that is arranged so as to be stacked on the display panel; a position sensor for acquiring position information of a viewer; and a control unit for moving a parallax barrier in which transmitting regions and non-transmitting regions are formed in periodic fashion in a predetermined alignment direction, in such a manner that the parallax barrier is moved in the predetermined alignment direction in accordance with the position information, with use of a predetermined barrier switching pitch as a minimum unit, and causing the switch liquid crystal panel to display the parallax barrier. The plurality of pixels have openings each of which has a width A in the alignment direction, the width A satisfying the following expressions:

$$A \leq Wsl - 2Pe, \text{ and}$$

$$A \leq Wbr - 2Pe$$

where Wsl is a width of the transmitting region, Wbr is a width of the non-transmitting region, and Pe is the barrier switching pitch (the first configuration).

The control unit moves the parallax barrier with use of a predetermined barrier switching pitch as a minimum unit, and causes the switch liquid crystal panel to display the parallax barrier. When the parallax barrier is moved for the barrier switching pitch, the liquid crystal state is changed in an area in a width twice the barrier switching pitch. The response speed of liquid crystal is limited, and further, there is a speed difference between a case where the change is from the transmitting region to the non-transmitting region, and a case where the change is from the non-transmitting region to the transmitting region.

According to the configuration described above, the width of the opening is equal to or smaller than a width determined by subtracting a width of liquid crystal that behaves during the switching of the parallax barrier (a width twice the barrier switching pitch) from the width of the transmitting region. Further, the width of the opening is equal to or smaller than a width determined by subtracting a width of liquid crystal that behaves during the switching of the subtracting parallax barrier (a width twice the barrier switching pitch) from the width of the non-transmitting region. As a result of this, over a period before and after the switching of the parallax barrier, pixels that should be displayed are not shielded by the parallax barrier, and pixel that should be shielded by the parallax barrier are not displayed. This enables to reduce luminance variation and increase of crosstalk, over a period before and after the switching of the parallax barrier.

In the first configuration, the control unit preferably causes the parallax barrier to be displayed on the switch liquid crystal panel in such a manner that the width of the transmitting region and the width of the non-transmitting region are equal to each other (the second configuration).

The first or second configuration may be such that the switch liquid crystal panel includes: a liquid crystal layer; a first substrate and a second substrate that are opposed to each other with the liquid crystal layer being interposed therebetween; a first electrode group that is formed on the first substrate, and includes a plurality of electrodes that are arranged in the alignment direction at an interval equal to the barrier switching pitch; and a common electrode that is formed on an approximately front surface of the second substrate (the third configuration).

The first or second configuration may be such that the switch liquid crystal panel includes: a liquid crystal layer; a first substrate and a second substrate that are opposed to each other with the liquid crystal layer being interposed therebetween; a first electrode group that is formed on the first substrate, and includes a plurality of electrodes that are arranged in the alignment direction at an interval twice the barrier switching pitch; and a second electrode group that is formed on the second substrate, and includes a plurality of electrodes that are arranged in the alignment direction at an interval twice the barrier switching pitch, wherein the first electrode group and the second electrode group are arranged so as to be deviated with respect to each other by the barrier switching pitch in the alignment direction (the fourth configuration).

According to the configuration described above, the barrier switching pitch can be set to half of the interval for the formation of the first electrode group and the second electrode group, which allows the parallax barrier position to be switched more finely, whereby luminance variation and increase of crosstalk can be reduced. Further, as the barrier switching pitch can be made smaller, the opening of the pixel can be widened while the requirements of the first configuration remain satisfied, which makes it possible to increase the luminance (transmittance) of the display panel. Further, this configuration is hardly influenced by voltage drop, which tends to occur as the electrode width decreases, and hence, this enables the development to a larger screen with excellent 3D quality being maintained.

The fourth configuration may be such that, in accordance with the position information, the control unit drives a part of the electrodes included in one electrode group selected from the first and second electrode groups, with a first phase, and drives the other electrodes with a second phase having a polarity opposite to that of the first phase (the fifth configuration).

The fourth configuration may be such that, in accordance with the position information, the control unit drives a part of the electrodes included in one electrode group selected from the first and second electrode groups, with a constant potential, and drives the other electrodes in such a manner that a polarity is reversed with respect to the constant potential at a predetermined cycle (the sixth configuration).

The fourth configuration may be such that, in accordance with the position information, the control unit drives a part of the electrodes included in one electrode group selected from the first and second electrode groups, in such a manner that a polarity is reversed with respect to a predetermined constant potential at a predetermined cycle, and drives the other electrodes with the predetermined constant potential (the seventh configuration).

Any one of the first to seventh configurations may be such that the switch liquid crystal panel is arranged on a side to the viewer with respect to the display panel (the eighth configuration).

According to the configurations described above, light from the display panel is separated by the switch liquid crystal panel. This configuration has excellent separation properties, as compared with the ninth configuration described below.

Any one of the first to seventh configurations may be such that the display panel is arranged on a side to the viewer with respect to the switch liquid crystal pane (the ninth configuration).

According to the configuration described above, light separated by the switch liquid crystal panel passes through the display panel. In this configuration, the light separated by the switch liquid crystal panel is scattered or diffracted by the display panel. This allows angle-dependent variation of luminance more moderate.

Any one of the first to ninth configurations may be such that the display panel is a liquid crystal display panel (the tenth configuration).

[Embodiments]

The following describes embodiments of the present invention in detail, while referring to the drawings. In the drawings, identical or equivalent parts are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily reflect the real dimension ratios.

[The First Embodiment]
[Overall Configuration]

FIG. 1 is a schematic cross-sectional view illustrating a configuration of a stereoscopic display device 1 according to the First Embodiment of the present invention. The stereoscopic display device 1 includes a display panel 10, a switch liquid crystal panel 20, and an adhesive resin 30. The display panel 10 and the switch liquid crystal panel 20 are arranged so as to be stacked in such a manner that the display panel 10 is positioned on the viewer 90 side, and are stuck with each other with the adhesive resin 30.

The display panel 10 includes a TFT (thin film transistor) substrate 11, a CF (color filter) substrate 12, a liquid crystal layer 13, and polarizing plates 14 and 15. The display panel 10 controls TFT substrate 11 and the CF substrate 12 so as to operate the alignment of liquid crystal molecules in the liquid crystal layer 13, thereby to display images.

The switch liquid crystal panel 20 includes a first substrate 21, a second substrate 22, a liquid crystal layer 23, and a polarizing plate 24. The first substrate 21 and the second substrate 22 are arranged so as to be opposed to each other. The liquid crystal layer 23 is interposed between the first substrate 21 and the second substrate 22. The polarizing plate 24 is arranged on a side to a backlight (the side opposite to the display panel 10).

Though FIG. 1 does not illustrate detailed configuration, electrodes are formed on the first substrate 21 and the second substrate 22. The switch liquid crystal panel 20 controls potentials of these electrodes so as to operate the alignment of liquid crystal molecules of the liquid crystal layer 23, thereby to change behavior of light passing through the liquid crystal layer 23. More specifically, the switch liquid crystal panel 23 forms non-transmitting regions (barriers) that block light from the backlight, and transmitting regions (slits) that transmit light from the backlight, by using the alignment of the liquid crystal molecules of the liquid crystal layer 23 and the operations of the polarizing plate 14 and the polarizing plate 24. The configurations and operations of the first substrate 21 and the second substrate 22 are to be described in detail below.

The TFT substrate 11 and the CF substrate 12 have a thickness of, for example, 200 μm. The polarizing plate 14 has a thickness of, for example, 137 μm. The polarizing plate 15 has a thickness of, for example, 170 μm. The first substrate 21 and the second substrate 22 has a thickness of, for example, 225 μm. The thickness of the adhesive resin 30 is, for example, 50 μm.

The polarizing plate 14 may be arranged on the switch liquid crystal panel 20. More specifically, the configuration may be such that the polarizing plate 14 is arranged on a surface on the display panel 10 side of the second substrate 22 of the switch liquid crystal panel 20, and the adhesive resin 30 is arranged between the polarizing plate 14 and the TFT substrate 11.

Hereinafter, a direction parallel to a line extending between the left eye 90L and the right eye 90R of the viewer 90 when the viewer 90 and the stereoscopic display device 1 face each other directly (the x direction in FIG. 1) is referred to as a "horizontal direction". Further, the direction orthogonal to the horizontal direction in the surface of the display panel 10 (the y direction in FIG. 1) is referred to as a "vertical direction".

Figure 2:
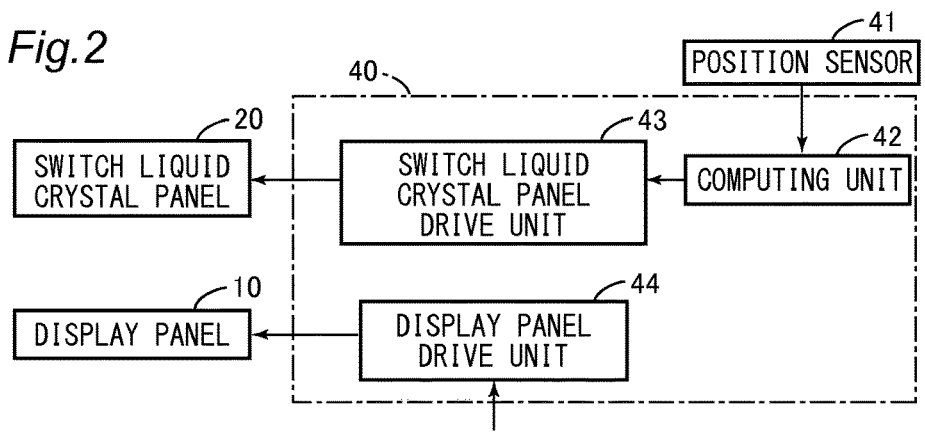
FIG. 2 is a block diagram illustrating a functional configuration of the stereoscopic display device according to the First Embodiment of the present invention.
Figure 3:
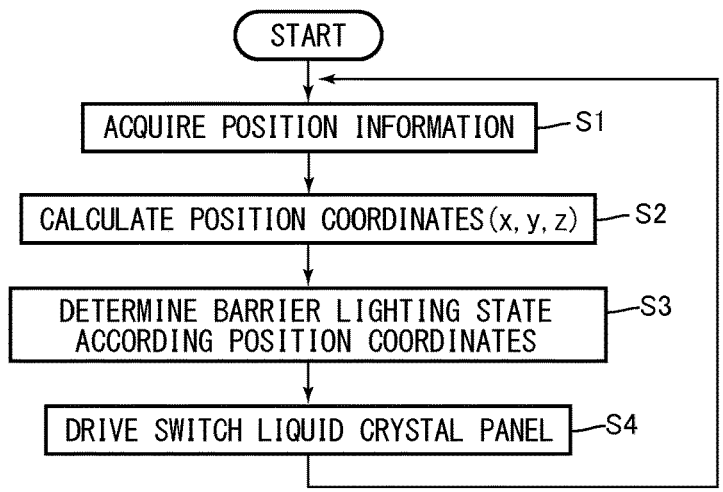
FIG. 3 is a flowchart of a processing by the stereoscopic display device according to the First Embodiment of the present invention.

FIG. 2 is a block diagram illustrating a functional configuration of the stereoscopic display device 1. FIG. 3 is a flowchart illustrating a processing operation by the stereoscopic display device 1. The stereoscopic display device 1 further includes a control unit 40 and a position sensor 41. The control unit 40 includes a computing unit 42, a switch liquid crystal panel drive unit 43, and a display panel drive unit 44.

The display panel drive unit 44 drives the display panel 10 based on a video signal that is input from outside, and causes the display panel 10 to display an image.

The position sensor 41 acquires position information regarding the position of the viewer 90 (Step S1). The position sensor 41 is, for example, a camera or an infrared light sensor. The position sensor 41 supplies the acquired position information to the computing unit 42 of the control unit 40.

The computing unit 42 analyzes the position information of the viewer 90 supplied from the position sensor 41, and calculates position coordinates (x, y, z) of the viewer 90 (Step S2). The calculation of the position coordinates can be performed by, for example, an eye tracking system for detecting the position of the eyes of the viewer 90 by image processing. Alternatively, the calculation of the position coordinates may be performed by a head tracking system for detecting the position of the head of the viewer 90 with infrared light.

The computing unit 42 further determines a barrier lighting state of the switch liquid crystal panel 20 according to the position coordinates of the viewer 90 (Step S3). More specifically, according to the position coordinates of the viewer 90, the positions of the barriers and the positions of the slits of the switch liquid crystal panel 20 are determined. The computing unit 42 supplies the determined information of the barrier lighting state to the switch liquid crystal panel drive unit 43.

The switch liquid crystal panel drive unit 43 drives the switch liquid crystal panel 20 based on the information supplied from the computing unit 42 (Step S4). Thereafter, Steps S1 to S4 are repeated.

Next, the following description explains principles of the stereoscopic display by the stereoscopic display device 1, using FIGS. 4A to 4C and FIGS. 5A to 5C. As mentioned above, in the stereoscopic display device 1, the display panel 10 is arranged on the viewer 90 side. In the illustration by the drawings referred to hereinafter, however, the switch liquid crystal panel 20 is positioned on the viewer 90 side with respect to the display panel 10, for convenience of explanation.

Figure 4A:
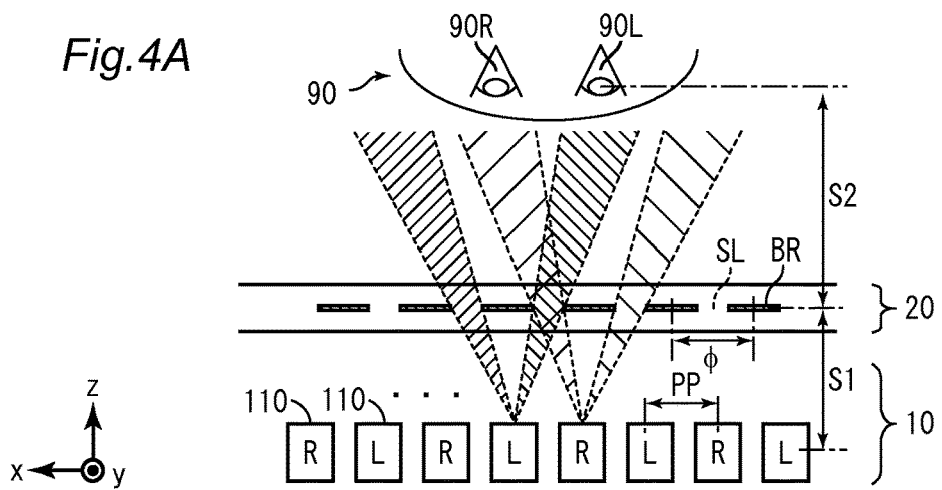
FIG. 4A is a view for explaining principles of the stereoscopic display by the stereoscopic display device according to the First Embodiment of the present invention.
Figure 4B:
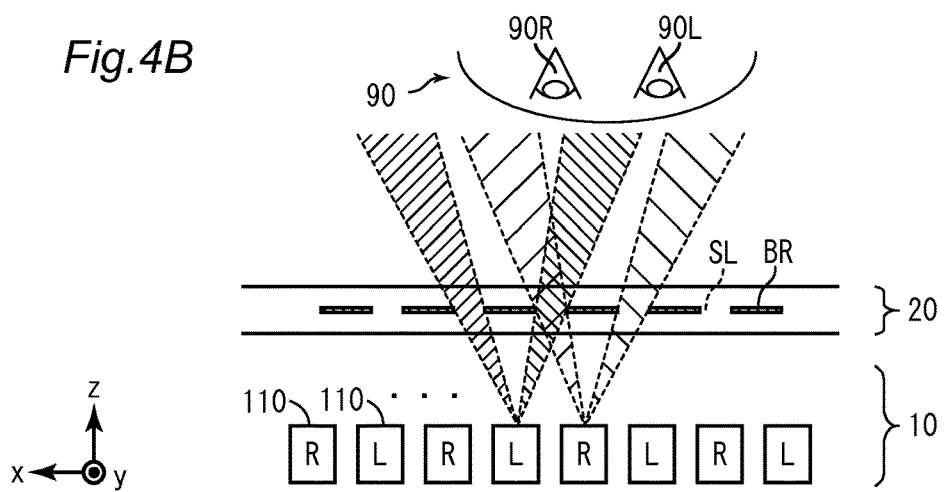
FIG. 4B is a view for explaining principles of the stereoscopic display by the stereoscopic display device according to the First Embodiment of the present invention.
Figure 4C:
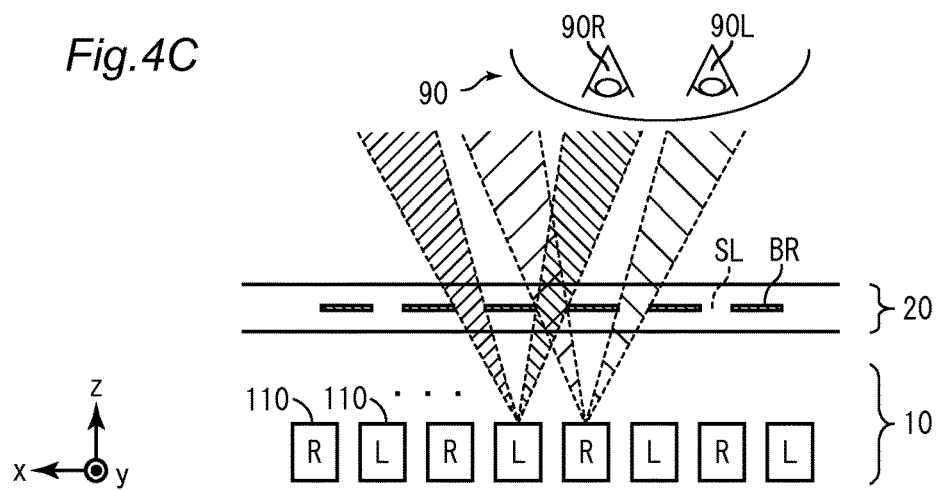
FIG. 4C is a view for explaining principles of the stereoscopic display by the stereoscopic display device according to the First Embodiment of the present invention.

First of all, a case is explained where the barrier lighting state is fixed, with reference to FIGS. 4A to 4C. The display panel 10 includes a plurality of pixels 110. On the pixels 110, a right-eye image (R) and a left-eye image (L) are alternately displayed in the horizontal direction. In the switch liquid crystal panel 20, barriers BR that block light from the display panel 10 and slits SL that transmit light from the display panel 10 are formed at a predetermined pitch. This allows only the right-eye image (R) to be visible to the right eye 90R of the viewer 90, and allows only the left-eye image (L) to be visible to the left eye 90L, as illustrated in FIG. 4A. This allows the viewer 90 to have a stereoscopic vision.

The pitch PP of the pixels 110 and the pitch φ of the barriers BR satisfy the following expression when S2 is sufficiently greater than S1:

$$\varphi \approx 2 \times PP$$

where S1 is a distance from the display surface of the display panel 10 to the barriers BR, and S2 is a distance from the barriers BR to the viewer 90.

FIG. 4B illustrates a state in which the viewer 90 has moved from the position shown in FIG. 4A in the horizontal direction. In this case, to the right eye 90R of the viewer 90, both of the right-eye image (R) and the left-eye image (L) are visible. Similarly, to the left eye 90L, both of the right-eye image (R) and the left-eye image (L) are visible. In other words, crosstalk is occurring, and the viewer 90 cannot have a stereoscopic vision.

FIG. 4C illustrates a state in which the viewer 90 has further moved from the position shown in FIG. 4B in the horizontal direction. In this case, to the right eye 90R of the viewer 90, the left-eye image (L) is visible, and to the left eye 90L thereof, the right-eye image (R) is visible. In this case, the state of pseudoscopic vision occurs wherein a video image that should be recognized as being positioned behind is observed in the foreground, and in contrast, a video image that should be recognized as being positioned in the foreground is observed behind, which makes the viewer 90 unable to have an appropriate stereoscopic vision, and give a feeling of incompatibility to him/her.

In this way, as the viewer 90 moves, a normal area where a stereoscopic vision can be obtained, a crosstalk area where crosstalk occurs, and a pseudoscopic area where the state of pseudoscopic vision occurs, appear repeatedly. Therefore, in the case where the barrier lighting state is fixed, the viewer 90 can have a stereoscopic vision only in limited areas.

Figure 5A:
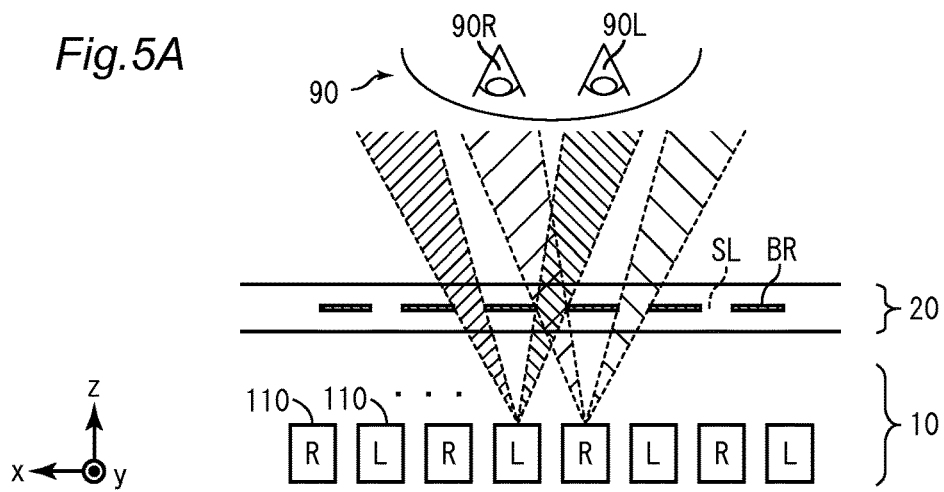
FIG. 5A is a view for explaining principles of the stereoscopic display by the stereoscopic display device according to the First Embodiment of the present invention.
Figure 5B:
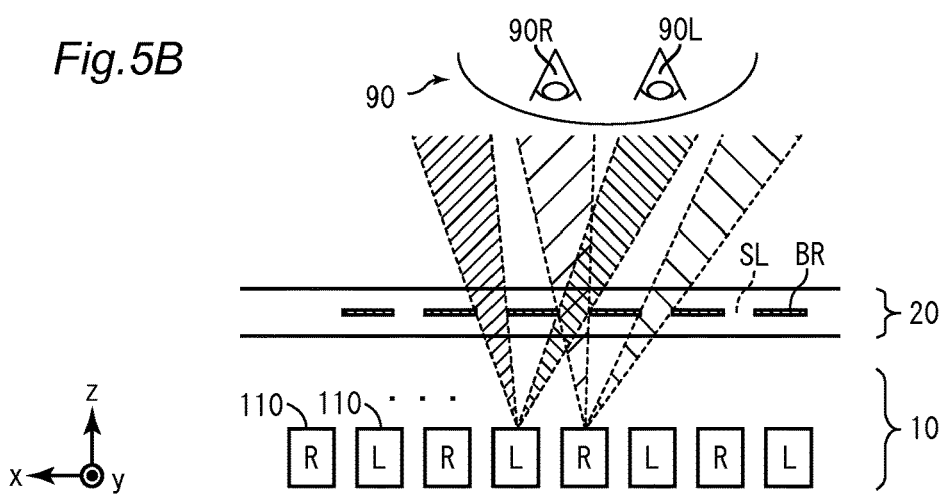
FIG. 5B is a view for explaining principles of the stereoscopic display by the stereoscopic display device according to the First Embodiment of the present invention.
Figure 5C:
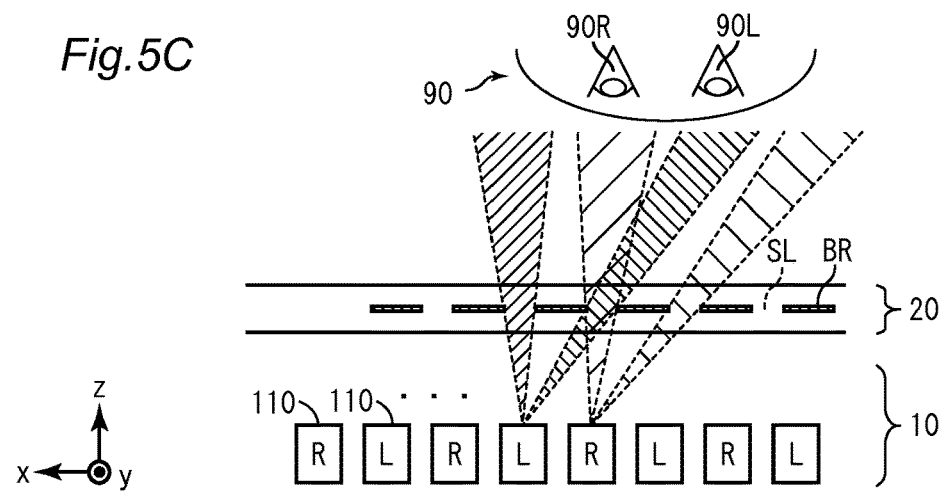
FIG. 5C is a view for explaining principles of the stereoscopic display by the stereoscopic display device according to the First Embodiment of the present invention.

In the present embodiment, the control unit 40 changes the barrier lighting state of the switch liquid crystal panel 20 according to the position information (position coordinates) of the viewer 90, as illustrated in FIGS. 5A to 5C. This allows the viewer 90 to have a stereoscopic vision always, and prevents crosstalk and the state of pseudoscopic vision from occurring.

[Configuration of Switch Liquid Crystal Panel 20]

Figure 6A:
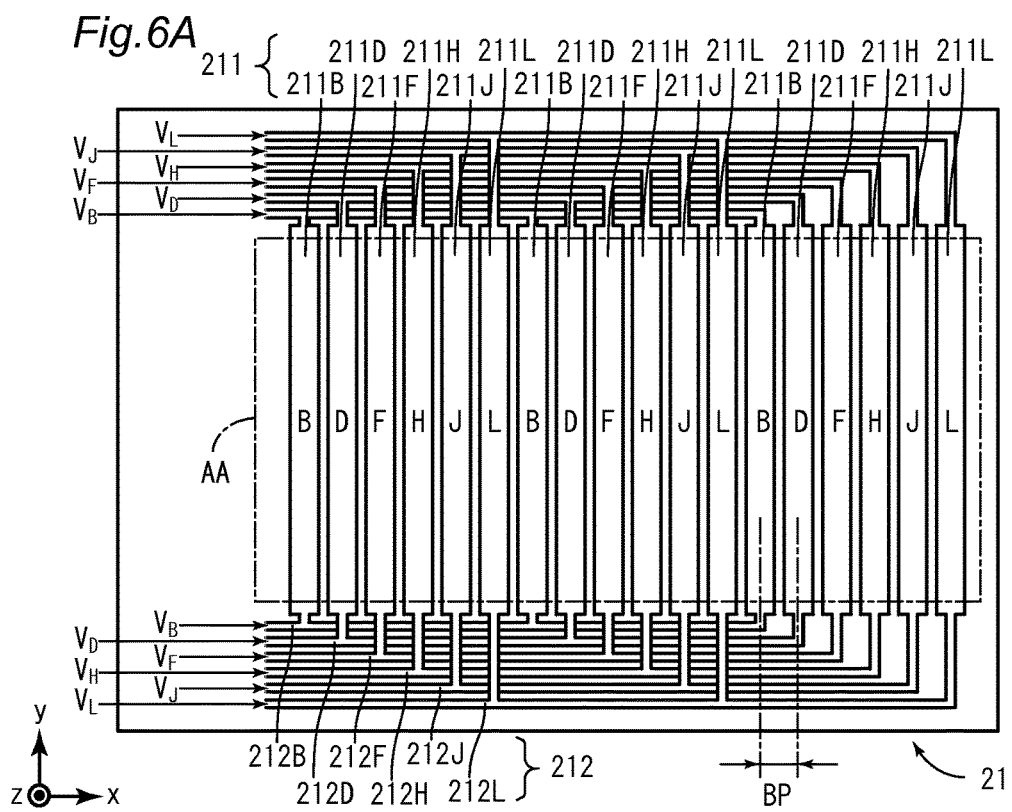
FIG. 6A is a plan view illustrating a configuration of a first substrate of a switch liquid crystal panel.

FIG. 6A is a plan view illustrating a configuration of the first substrate 21 of the switch liquid crystal panel 20. In the first substrate 21, a first electrode group 211 is formed. The first electrode group 211 includes a plurality of electrodes that are arranged at an electrode pitch BP in the x direction. Each of the electrodes extends in the y direction, and are arranged in parallel with one another.

In the first substrate 21, further, a line group 212 that are electrically connected to the first electrode group 211 are formed. Preferably, the line group 212 is formed outside an area (active area AA) that overlaps a display area of the display panel 10 when the switch liquid crystal panel 20 is stacked over the display panel 10.

To the first electrode group 211, signals of six systems, that is, signals $V_B, V_D, V_F, V_H, V_J$, and $V_L$ are supplied from the control unit 40 via the line group 212. Hereinafter, among the electrodes of the first electrode group 211, those to which the signals $V_B, V_D, V_F, V_H, V_J$, and $V_L$ are supplied are referred to as "electrodes 211B, 211D, 211F, 211H, 211J, and 211L", respectively. Further, lines electrically connected to the electrodes 211B, 211D, 211F, 211H, 211J, and 211L are referred to as "lines 212B, 212D, 212F, 212H, 212J, and 212L", respectively.

The electrodes 211B, 211D, 211F, 211H, 211J, and 211L are arranged in the x direction in this order cyclically. In other words, the electrodes are arranged in such a manner that, to the sixth adjacent electrode from a certain electrode, the same signal as that supplied to the latter electrode is supplied.

Figure 6B:
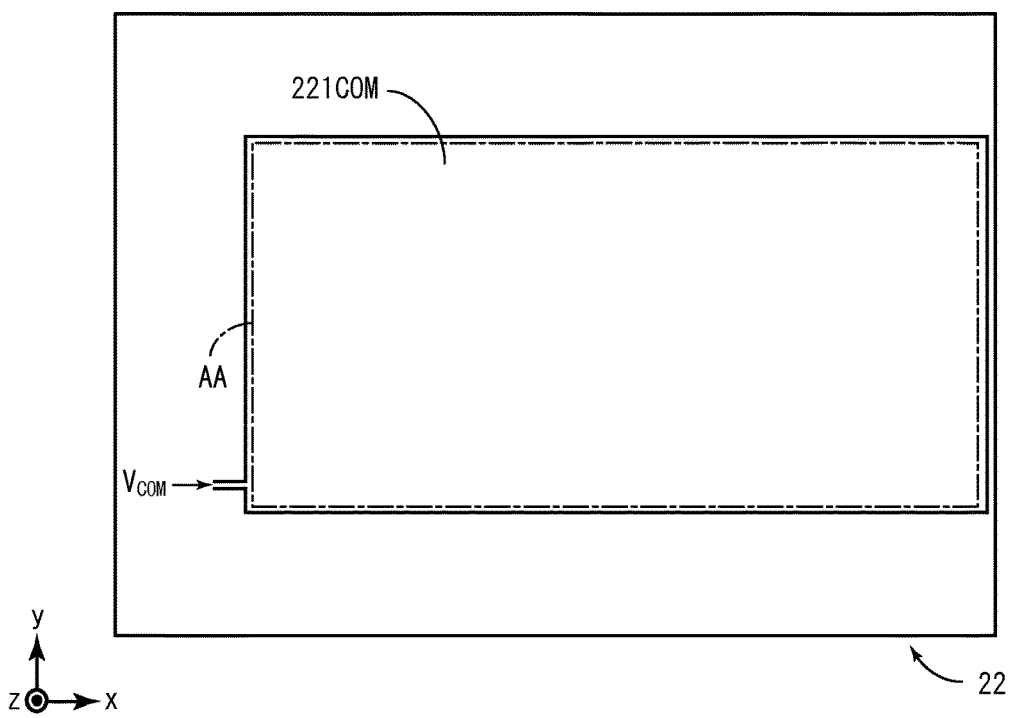
FIG. 6B is a plan view illustrating a configuration of a second substrate of the switch liquid crystal panel.

FIG. 6B is a plan view illustrating a configuration of the second substrate 22 of the switch liquid crystal panel 20. On the second substrate 22, a common electrode 221COM is formed so as to cover an approximately entire surface of the active area AA. To the common electrode 221COM, a signal $V_{COM}$ is supplied from the control unit 40.

Figure 7:
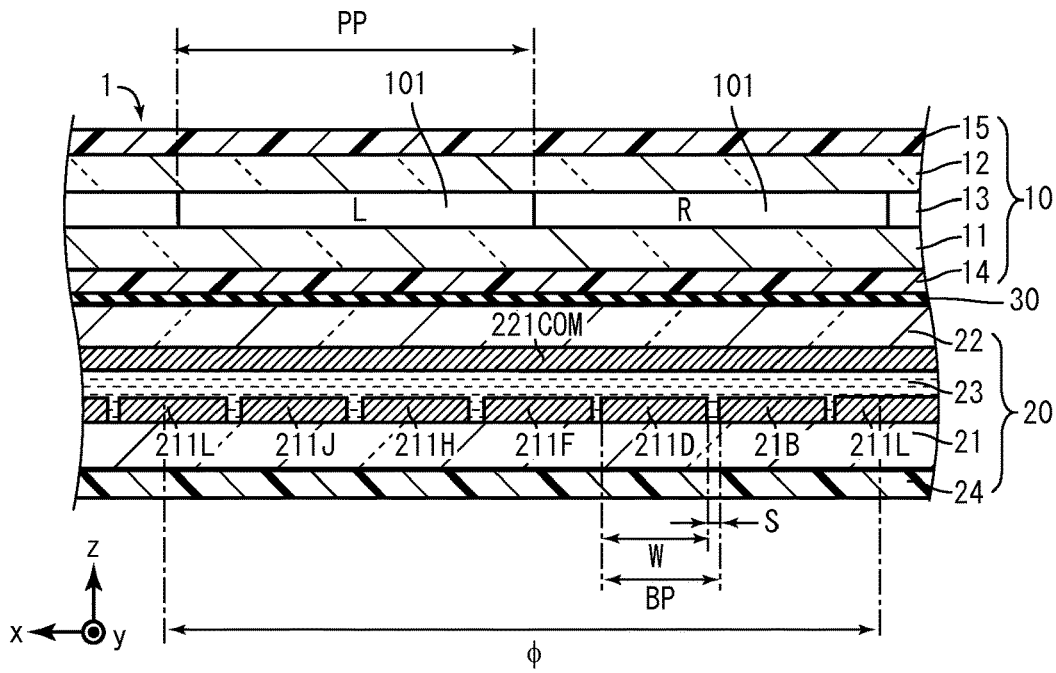
FIG. 7 is a cross-sectional view illustrating a schematic configuration of a stereoscopic display device according to the First Embodiment of the present invention.

FIG. 7 is a cross-sectional view illustrating a schematic configuration of the stereoscopic display device 1. The electrode pitch BP is a sum of the width W of the electrode and the clearance S between the electrodes. In the present embodiment, the configuration is such that the pitch BP satisfies BP=φ/6≈PP/3. Exemplary specific values there are PP=80.7 μm, BP=26.87 μm, W=22.87 μm, and S=4 μm.

Though not illustrated in FIG. 7, alignment films are formed on the first substrate 21 and the second substrate 22. The alignment film formed on the first substrate 21 and the alignment film formed on the second substrate 22 are rubbed in directions that intersect with each other. This causes the liquid crystal molecules of the liquid crystal layer 23 to be aligned in a state of the so-called twisted nematic alignment, in which the alignment direction rotates from the first substrate 21 toward the second substrate 22 in a state where no voltage is applied.

Further, the polarizing plate 14 and the polarizing plate 24 are arranged in such a manner that the light transmission axes thereof are orthogonal to each other. In other words, the liquid crystal of the switch liquid crystal panel 20 according to the present embodiment is so-called normally white liquid crystal, in which the maximum transmittance is obtained when no voltage is applied to the liquid crystal layer 23. This configuration, however, is a mere example, and the liquid crystal of the switch liquid crystal panel 20 may be a so-called normally black liquid crystal.

Figure 8A:
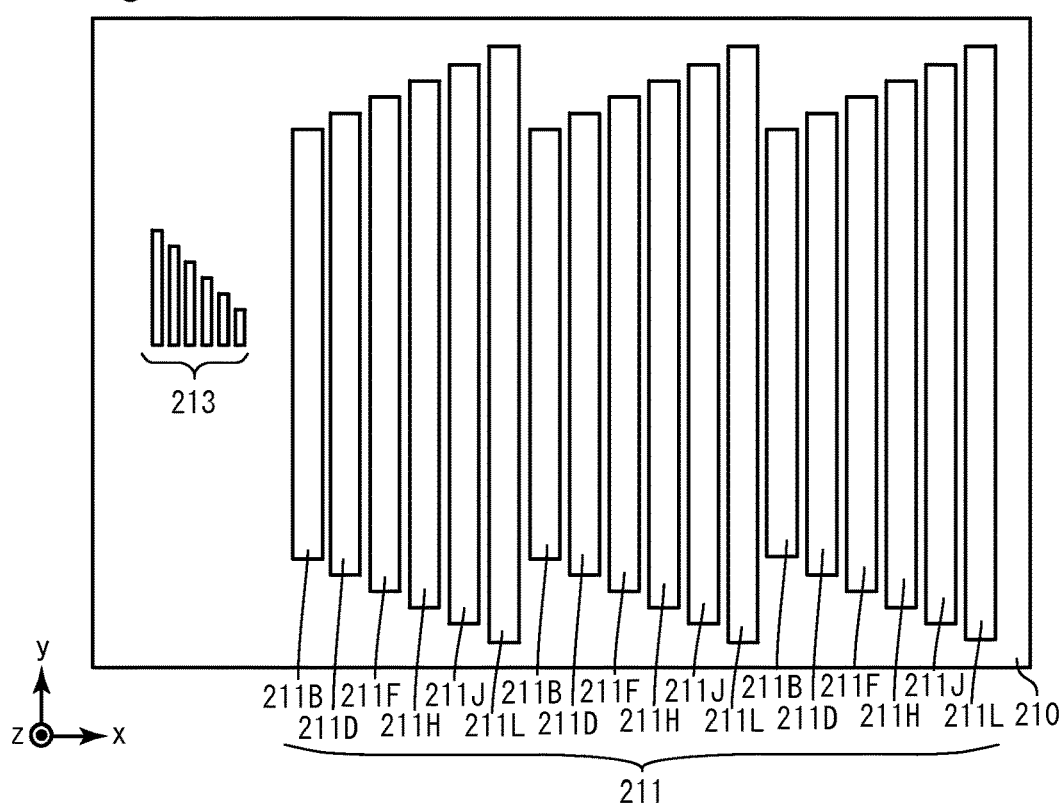
FIG. 8A is a view for explaining an exemplary method for producing the first substrate.

The following description explains an exemplary specific configuration of the first substrate 21, and an exemplary specific method for producing the same, while referring to FIGS. 8A to 8C.

First of all, as illustrated in FIG. 8A, the first electrode group 211 and the relay electrodes 213 are formed on the substrate 210. The relay electrodes 213 are electrodes for relaying the line group 212 that is to be formed in a later step. The substrate 210 is a substrate that has translucency and insulation properties, for example, a glass substrate. The first electrode group 211 and the relay electrodes 213 preferably have translucency, for example, made of ITO (indium tin oxide). The first electrode group 211 and the relay electrodes 213 are formed by the following process, for example: films are formed by sputtering or CVD (chemical vapor deposition), and are patterned by photolithography.

Next, as illustrated in FIG. 8B, an insulating film 214 is formed so as to cover the substrate 210, the first electrode group 211, and the relay electrodes 213. In the insulating film 214, contact holes 214a and contact holes 214b are formed. The contact holes 214a are formed at such positions as to allow the first electrode group 211 and the line group 212, which is to be formed in the next step, to be connected with each other. The contact holes 214b are formed at such positions as to allow the relay electrodes 213 and the line group 212 to be connected with each other.

The insulating film 214 preferably has translucency, and is made of, for example, SiN. The insulating film 214, for example, is formed with a film formed by CVD, and contact holes 214a and contact holes 214b are formed therein by photolithography. In a case where the line group 212 is formed outside the active area, the patterning may be performed in such a manner that the insulating film 214 is formed only outside the active area.

Next, as illustrated in FIG. 8C, the line group 212 is formed. The line group 212 is connected via the contact holes 214a to the first electrode group 211, and is connected via the contact holes 214b to the relay electrodes 213. The line group 212 preferably has high conductivity, and is made of, for example, aluminum. The line group 212 may be made of ITO. The line group 212 is formed by the following process, for example: a film is formed by sputtering, and is patterned by photolithography.

As described above, the electrodes 211B, 211D, 211F, 211H, 211J, and 211L are connected with the lines 212B, 212D, 212F, 212H, 212J, and 212L, respectively. With this three-layer configuration of the first electrode group 211, the insulating film 214, and the line group 212, the first electrode group 211 and the line group 212 are caused to intersect as viewed in a plan view.

In the example illustrated in FIG. 8C, ends on one side of the line group 212 are gathered in the vicinities of a peripheral part of the substrate 21, and form a terminal part 212a. To the terminal part 212a, an FPC (flexible printed circuit) and the like is connected.

In the example illustrated in FIG. 8C, lines are connected to ends on both sides in the y direction of each electrode of the electrode group 211. The pair of lines connected to ends on both sides in the y direction of each electrode of the electrode group 211 are connected with each other by the relay electrodes 213. By applying a signal from both ends in the y direction of each electrode of the electrode group 211, a potential difference in the inside of each electrode can be reduced.

The second substrate 22 is obtained by, for example, forming the common electrode 221COM on a substrate having translucency and insulation properties. The common electrode 221COM is obtained by, for example, forming a film with ITO by CVD.

[Method for Driving Switch Liquid Crystal Panel 20]

Next, the following description explains a method for driving the switch liquid crystal panel 20, while referring to FIG. 9 and FIGS. 10A to 10C.

Figure 9:
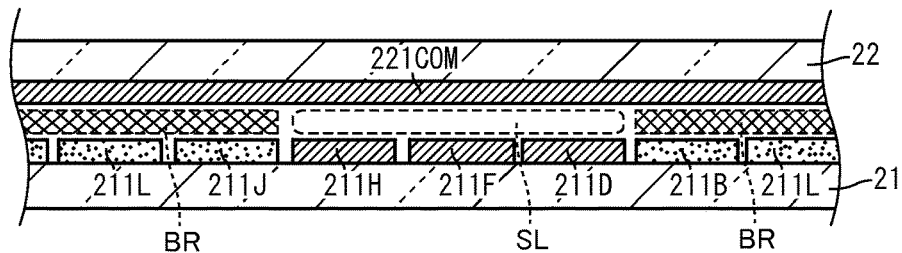
FIG. 9 is a cross-sectional view schematically illustrating a barrier lighting state of the switch liquid crystal panel.
Figure 10A:
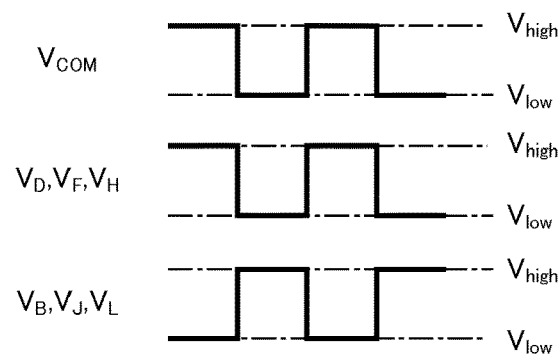
FIG. 10A illustrates exemplary waveforms of signals $V_{COM}$, $V_B$, $V_D$, $V_F$, $V_J$, $V_H$, and $V_L$ supplied to respective electrodes so as to turn the switch liquid crystal panel 20 into the barrier lighting state illustrated in FIG. 9.

FIG. 9 is a cross-sectional view schematically illustrating one barrier lighting state of the switch liquid crystal panel 20. FIG. 10A illustrates exemplary waveforms of signals $V_{COM}$, $V_B$, $V_D$, $V_F$, $V_J$, $V_H$, and $V_L$ supplied to respective electrodes so as to turn the switch liquid crystal panel 20 into the barrier lighting state illustrated in FIG. 9.

The control unit 40 drives the common electrode 221COM, the electrode 211D, the electrode 211F, and the electrode 211H with the same phase, and drives the other electrodes with a phase having an opposite polarity. FIG. 9 schematically illustrates the electrodes driven in the phase having a polarity opposite to that for the common electrode 221COM, by denoting the same with a sandy pattern.

In an example illustrated in FIG. 10A, the control unit 40 applies rectangular alternating-current voltages having opposite polarities to the common electrode 221COM, the electrode 211D, the electrode 211F, and the electrode 211H on one hand, and to the other electrodes on the other hand, respectively.

As illustrated in FIG. 10A, the signals $V_{COM}$, $V_B$, $V_D$, $V_F$, $V_J$, $V_H$, and $V_L$ preferably have the same amplitude. In the example illustrated in FIG. 10A, the signals $V_{COM}$, $V_B$, $V_D$, $V_F$, $V_J$, $V_H$, and $V_L$ have either a predetermined high-level potential ($V_{high}$, for example 5V), or a predetermined low-level potential ($V_{low}$, for example 0V).

This allows a potential difference of $|V_{high}-V_{low}|$ to occur between the common electrode 221COM and the electrode 211B, thereby causing the liquid crystal molecules of the liquid crystal layer 23 between the common electrode 221COM and the electrode 211B to be aligned in the z direction. As described above, the liquid crystal of the switch liquid crystal panel 20 is normally white liquid crystal. Therefore, the barriers BR are formed in portions where the common electrode 221COM and the electrode 211B overlap as viewed in a plan view (the xy plan view).

Similarly, the barriers BR are formed in a portion where the common electrode 221COM and the electrode 211J overlap, and in a portion where the common electrode 221COM and the electrode 211L overlap, when viewed in the plan view.

On the other hand, no potential difference occurs to between the common electrode 221COM and the electrode 211D, the electrode 211F, and the electrode 211H. As described above, the liquid crystal of the switch liquid crystal panel 20 is normally white liquid crystal. Therefore, the slits SL are formed in portions where the common electrode 221COM, and the electrode 211D, the electrode 211F, and the electrode 211H, overlap when viewed in the plan view.

In this way, in the present example, the slits SL are formed in at positions overlapping the electrode driven with the same phase as that for the common electrode 221COM when viewed in the plan view, and the barriers BR are formed at positions overlapping the other electrodes when viewed in the plan view.

Figure 10B:
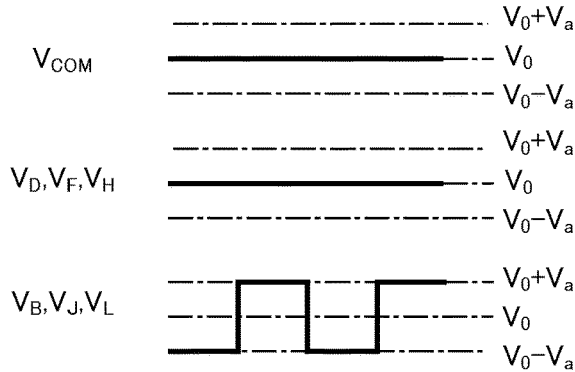
FIG. 10B illustrates other exemplary waveforms of signals $V_{COM}$, $V_B$, $V_D$, $V_F$, $V_J$, $V_H$, and $V_L$ supplied to respective electrodes so as to turn the switch liquid crystal panel 20 into the barrier lighting state illustrated in FIG. 9.

FIG. 10B illustrates other exemplary waveforms of signals $V_{COM}$, $V_B$, $V_D$, $V_F$, $V_J$, $V_H$, and $V_L$ supplied to respective electrodes so as to turn the switch liquid crystal panel 20 into the barrier lighting state illustrated in FIG. 9.

In the example illustrated in FIG. 10B, the control unit 40 sets the common electrode 221COM, the electrode 211D, the electrode 211F, and the electrode 211H to a constant potential $V_0$ (for example, GND), and applies a rectangular alternating-current voltage that alternates with a half amplitude of $V_a$ (for example, $V_a$=5V) with respect to a potential of $V_0$ as the center, to the electrode 211B, the electrode 211J, and the electrode 211L.

This causes a potential difference of $|V_a|$ to occur in the portions overlapping the electrodes 211B, 211J, and 211L as viewed in a plan view, thereby causing the barriers BR to be formed. On the other hand, no potential difference occurs in the portions overlapping the electrodes 211D, 211F, and 211H as viewed in a plan view, thereby causing the slits SL to be formed therein.

Figure 10C:
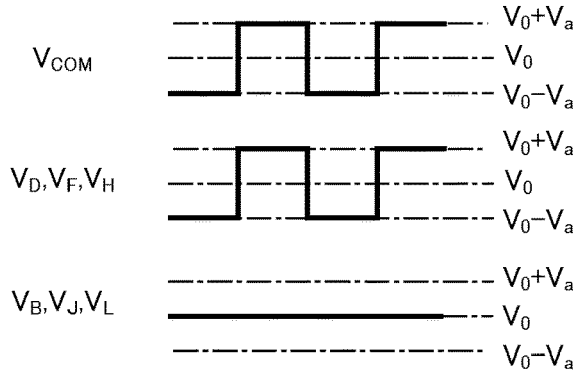
FIG. 10C illustrates still other exemplary waveforms of signals $V_{COM}$, $V_B$, $V_D$, $V_F$, $V_J$, $V_H$, and $V_L$ supplied to respective electrodes so as to turn the switch liquid crystal panel 20 into the barrier lighting state illustrated in FIG. 9.

FIG. 10C illustrates still other exemplary waveforms of signals $C_{COM}$, $V_B$, $V_D$, $V_F$, $V_J$, $V_H$, and $V_L$ supplied to respective electrodes so as to turn the switch liquid crystal panel 20 into the barrier lighting state illustrated in FIG. 9.

In the example illustrated in FIG. 10C, the control unit 40 applies a rectangular alternating-current voltage that alternates with a half amplitude of $V_a$ (for example, $V_a$=5V) with respect to a potential of $V_0$ as the center, to the common electrode 221COM, the electrode 211D, the electrode 211F, and the electrode 211H, and sets the electrode 211B, the electrode 211J, and the electrode 211L to a constant potential V₀ (for example, GND).

This causes a potential difference of $|V_a|$ to occur in the portions overlapping the electrodes 211B, 211J, and 211L as viewed in a plan view, thereby causing the barriers BR to be formed. On the other hand, no potential difference occurs in the portions overlapping the electrodes 211D, 211F, and 211H as viewed in a plan view, thereby causing the slits SL to be formed therein.

As described above, according to the present embodiment, it is possible to control the barrier lighting state by using the electrodes 211B, 211D, 211F, 211H, 211J, and 211L as units. In other words, it is possible to control the barrier lighting state by using the electrode pitch BP as a minimum unit.

[Configuration of Pixel 110 of Display Panel 10]

FIG. 11 is a plan view for explaining a configuration of the pixel 110 of the display panel 10. The pixel 110 includes three subpixels 110a, 110b, and 110c arranged in the y direction, and a black matrix BM formed therebetween. The subpixels 110a, 110b, and 110c display, for example, red, green, and blue, respectively. The black matrix BM improves contrast of the display panel 10, blocking light from the backlight.

FIG. 12 schematically illustrates the relationship between the pixels 110, and the barriers BR and the slits SL formed by the switch liquid crystal panel 20. In FIG. 12, the barriers BR are indicated by hatching.

As illustrated in FIG. 12, the width of the barrier BR is given as Wbr, and the width of the slit SL is given as Wsl. Further, the minimum unit with which the barrier lighting state can be controlled (barrier switching pitch) is given as Pe. As mentioned above, in the present embodiment, the barrier switching pitch Pe is equal to the electrode pitch BP.

In the present embodiment, the control unit 40 controls the barrier lighting state of the switch liquid crystal panel 20 so that Wbr≈Wsl is satisfied.

The width of the opening of the pixel 110 in the alignment direction (x direction) of the barriers BR is given as A. Here, Wsl, Wbr, and A satisfy the following relationship:

$A \leq Wsl - 2Pe$, and $A \leq Wbr - 2Pe$

[Effects of Stereoscopic Display Device 1]

To explain the effects of the present embodiment, first of all, the following description describes preferable properties of a stereoscopic display device.

Figure 13:
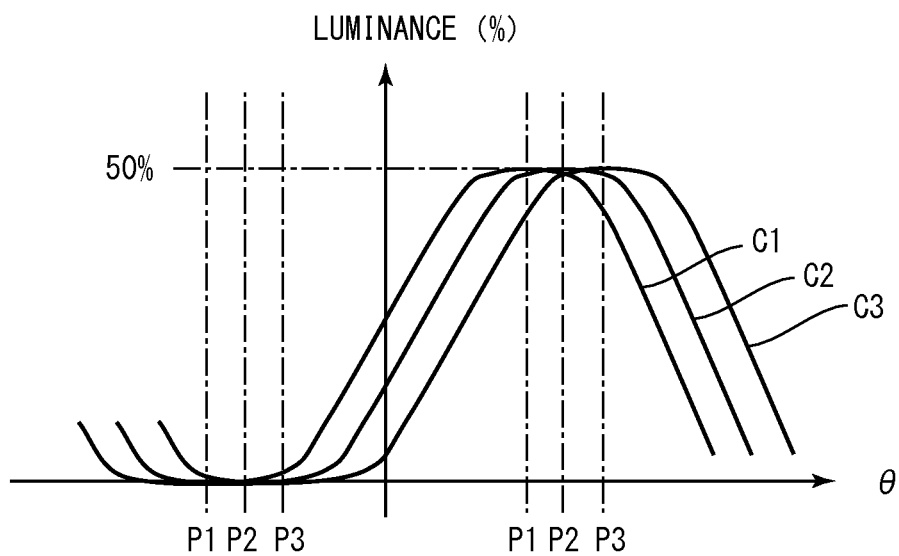
FIG. 13 schematically illustrates angle characteristics of luminance when the barrier lighting state of the switch liquid crystal panel is changed.

FIG. 13 schematically illustrates angle characteristics of luminance when the barrier lighting state of the switch liquid crystal panel 20 is changed. More specifically, FIG. 13 illustrates angle characteristics of luminance in the case where a black image is displayed as the left-eye image, and a white image is displayed as the right-eye image. By switching the barrier lighting state according to the viewing positions P1, P2, and P3, angle characteristics of luminance as indicated by the curves C1, C2, and C3 are obtained. The luminance herein is a relative value with respect to a luminance when white images are displayed as both of the left-eye image and the right-eye image (i.e., the luminance in the case where white is displayed on the entire surface of the display panel 10), which is regarded as 100%.

As illustrated in FIG. 13, each of the curves C1, C2, and C3 is preferably has a flat vertex and a large width. This causes the curves for adjacent viewing positions to have greater overlap. In other words, this makes it possible to reduce a change in the luminance during the moving of the viewing position from a certain position to an adjacent viewing position. Further, even in a case where a period from the recognition of the position of the viewer to the start of switching of the barrier lighting state (delay time) is long, influence of the same can be reduced.

Next, the following description explains crosstalk. For this purpose, first of all, crosstalk is quantitatively defined, using FIG. 14.

Figure 14:
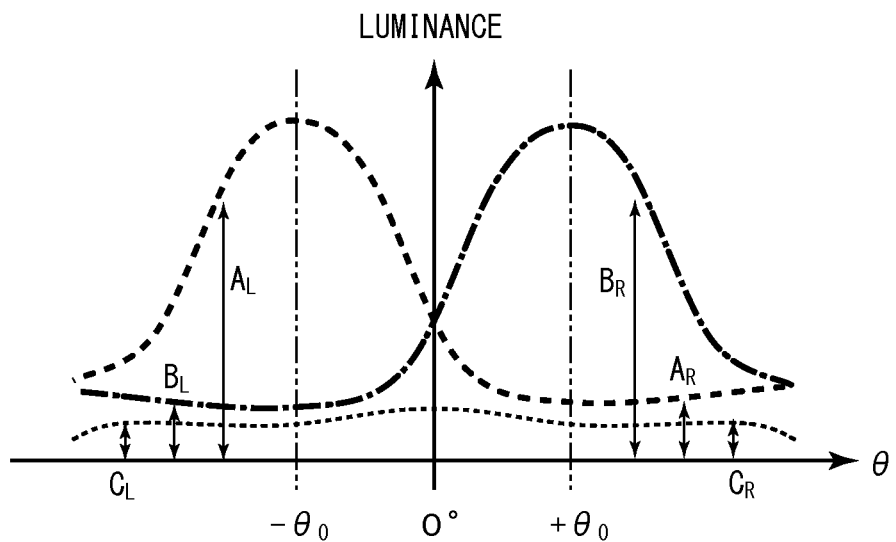
FIG. 14 illustrates angle characteristics of luminance of the stereoscopic display device when the barrier lighting state is fixed.

FIG. 14 illustrates angle characteristics of luminance of the stereoscopic display device 1 when the barrier lighting state is fixed. Luminance $A_L$ is luminance observed at an angle θ of less than 0 (θ<0) when a black images is displayed as the right-eye image and a white image is displayed as the left-eye image. Luminance AR is luminance observed at an angle θ of more than 0 (θ>0) on the same screen. Luminance BL is luminance observed at an angle θ of less than 0 (θ<0) when a white image is displayed as the right-eye image, and a black image is displayed as the left-eye image. Luminance BR is luminance observed at an angle θ of more than 0 (θ>0) on the same screen. Luminance CL is luminance observed at an angle θ of less than 0 (θ<0) when black images are displayed as both of the right-eye image and the left-eye image. Luminance CR is luminance observed at an angle θ of more than 0 (θ>0) on the same screen.

Here, crosstalk XT(L) for the left eye is defined by the following expression:

$$XT(L)[\%] = \frac{B_L(\theta) - C_L(\theta)}{A_L(\theta) - C_L(\theta)} \times 100 \qquad \text{[Formula 1]}$$

Similarly, crosstalk XT(R) for the right eye is defined by the following expression:

$$XT(R)[\%] = \frac{B_R(\theta) - C_R(\theta)}{A_R(\theta) - C_R(\theta)} \times 100 \qquad \text{[Formula 2]}$$

Figure 15:
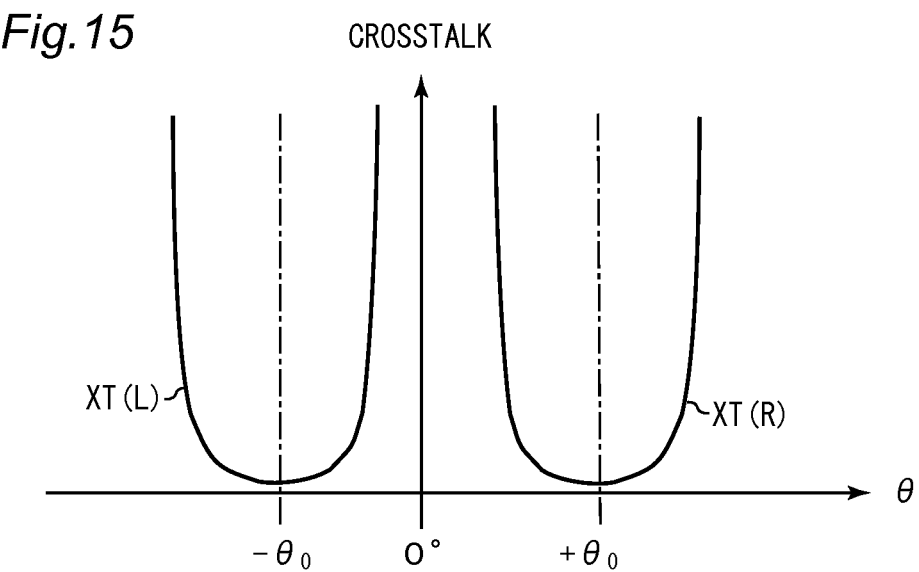
FIG. 15 illustrates angle characteristics of crosstalk for the left eye and crosstalk for the right eye.

FIG. 15 illustrates angle characteristics of crosstalk XT(L) for the left eye and crosstalk XT(R) for the right eye. The crosstalk XT(L) for the left eye has a minimum value at an angle $-\theta_0$, and increases as the angle increases/decreases from the angle $-\theta_0$. Similarly, the crosstalk XT(R) for the right eye has a minimum value at an angle $+\theta_0$, and increases as the angle increases/decreases from the angle $+\theta_0$.

Figure 16:
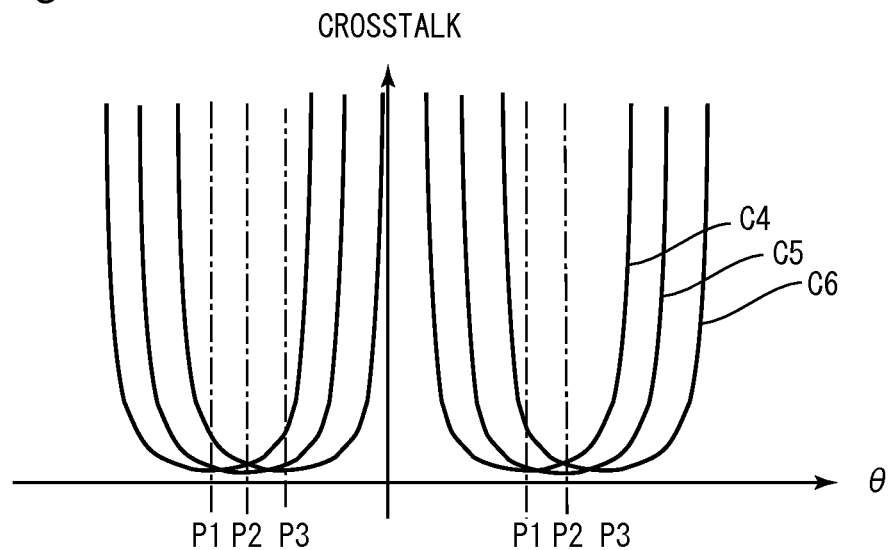
FIG. 16 illustrates angle characteristics of crosstalk when the barrier lighting state is changed.

FIG. 16 illustrates angle characteristics of crosstalk when the barrier lighting state is changed. The barrier lighting state is switched according to the viewing positions P1, P2, and P3, whereby angle characteristics of crosstalk as indicated by the curves C4, C5, and C6 are obtained.

As illustrated in FIG. 16, each of the curves C4, C5, and C6 preferably has a flat vertex and a large width. This causes the curves for adjacent viewing positions to have greater overlap. In other words, this makes it possible to keep crosstalk at a low level while the viewing position is moving from a certain position to an adjacent viewing position. Further, even in a case where a period from the recognition of the position of the viewer to the start of switching of the barrier lighting state (delay time) is long, influence of the same can be reduced.

Generally, time required for switching the barrier lighting state is preferably short. The response speed of liquid crystal, therefore, is preferably fast. With a configuration wherein angle characteristics of luminance, and angle characteristics of crosstalk are obtained as mentioned above, however, it is possible to reduce the influence exerted on the 3D quality by the time required for the switching of the barrier lighting state.

Figure 17A:
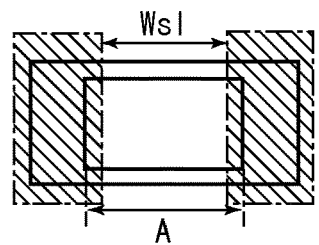
FIG. 17A schematically illustrates a case where the width of the slit is smaller than the width of the opening.
Figure 17B:
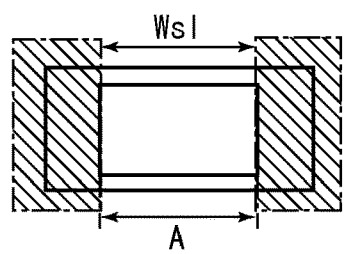
FIG. 17B schematically illustrates a case where the width of the slit is equal to the width of the opening.
Figure 17C:
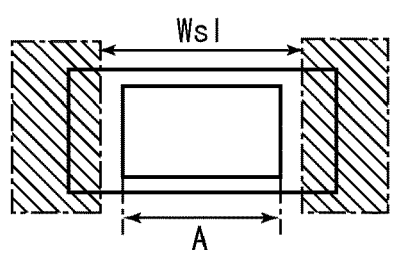
FIG. 17C schematically illustrates a case where the width of the slit is greater than the width of the opening.

Next, the following description describes the relationship of the width Wsl of the slit with the angle characteristics of luminance and angle characteristics of crosstalk. FIGS. 17A to 17C schematically illustrate the relationship between the width A of the opening of the pixel in the alignment direction of the barriers, and the width Wsl of the slit. FIG. 17A illustrates a case where the width Wsl of the slit is smaller than the width A of the opening, FIG. 17B illustrates a case where the width Wsl of the slit is equal to the width A of the opening, and FIG. 17C illustrates a case where the width Wsl of the slit is greater than the width A of the opening.

Figure 18:
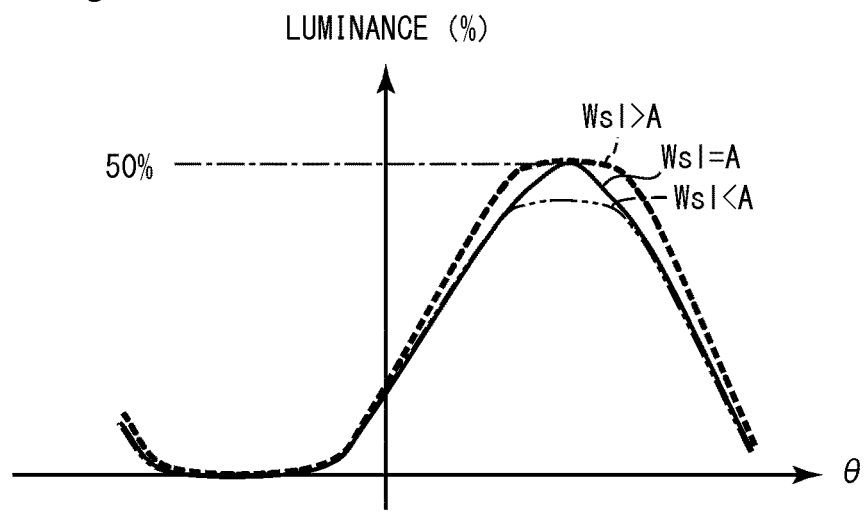
FIG. 18 schematically illustrates angle characteristics of luminance when the width of the slit is changed.

FIG. 18 schematically illustrates angle characteristics of luminance when the width of the slit Wsl is changed. When the width Wsl of the slit is smaller than the width A of the opening (Wsl<A), the luminance characteristics becomes flat, but the maximum luminance becomes less than 50%. On the other hand, when the width Wsl of the slit is equal to the width A of the opening (Wsl=A), the maximum luminance becomes 50%, but the distribution thereof becomes steep. When the width Wsl of the slit is larger than the width A of the opening (Wsl>A), the luminance characteristics are flat, and the maximum luminance is 50%.

Therefore, from the viewpoint of making the luminance characteristics flat, the width Wsl of the slit is preferably greater than the width A of the opening.

Figure 19:
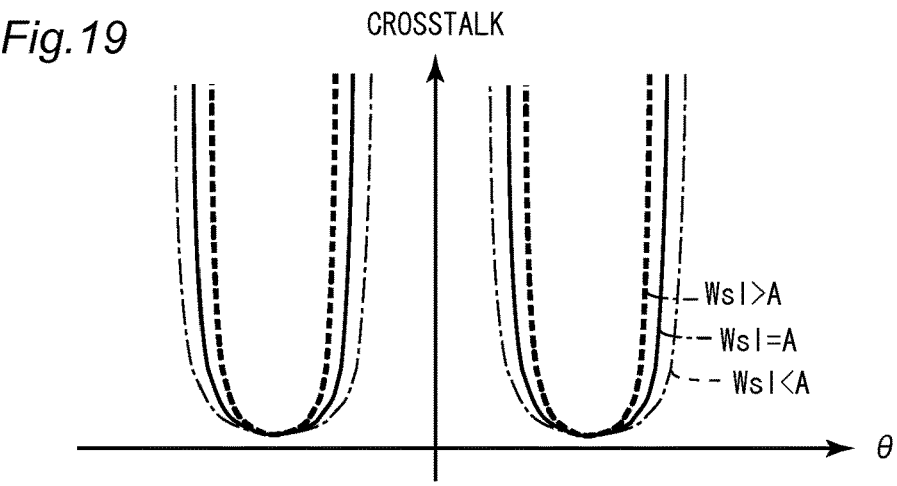
FIG. 19 schematically illustrates angle characteristics of crosstalk when the width of the slit is varied.

FIG. 19 schematically illustrates angle characteristics of crosstalk when the width Wsl of the slit is varied. In order to secure an area with lower crosstalk, it is preferable to make the width Wsl of the slit narrower, or to make the width A of the opening narrower.

Figure 20A:
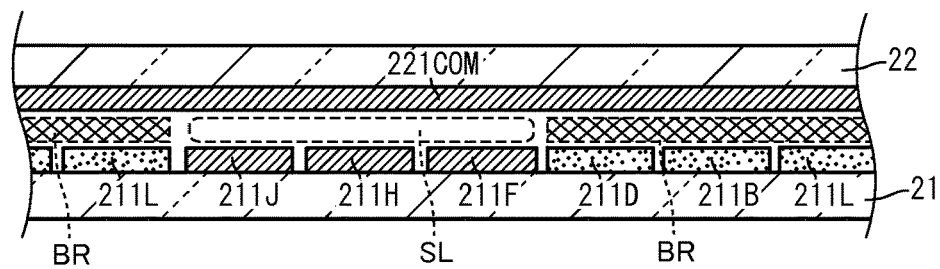
FIG. 20A schematically illustrates a state before the barrier lighting state is switched.
Figure 20B:
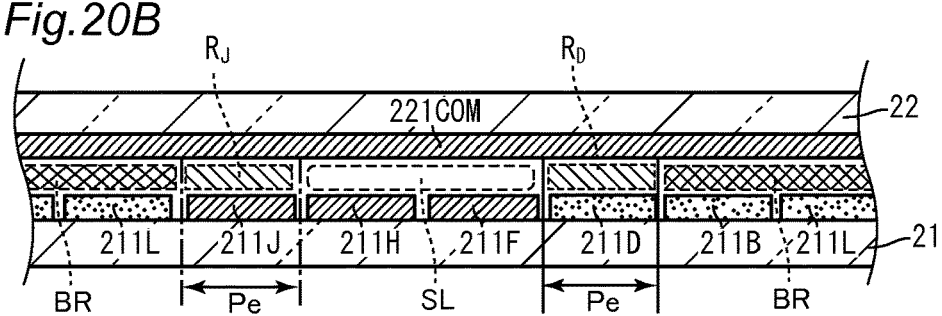
FIG. 20B schematically illustrates a state during the switching of the barrier lighting state.
Figure 20C:
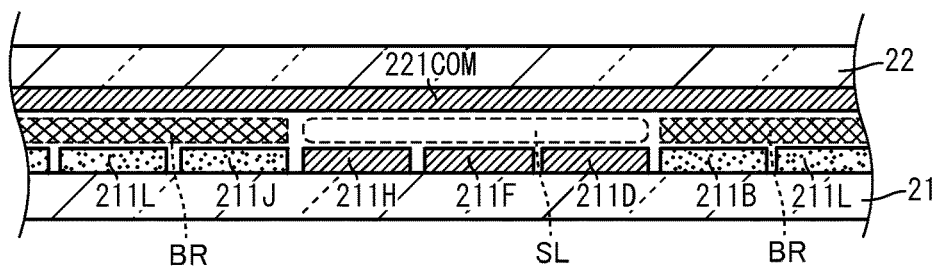
FIG. 20C schematically illustrates a state after the barrier lighting state is switched.

Next, the following description describes variation of luminance when the barrier lighting state of the switch liquid crystal panel 20 is switched, while referring to FIGS. 20A to 20C. FIGS. 20A to 20C schematically illustrate states over a period before and after the barrier lighting state is moved by one unit. More specifically, FIG. 20A schematically illustrates a state before the barrier lighting state is switched, FIG. 20B schematically illustrates a state during the switching of the barrier lighting state, and FIG. 20C schematically illustrates a state after the barrier lighting state is switched.

In FIG. 20A, the barriers BR are formed in areas that overlap the electrodes 211B, 211D, and 211L as viewed in a plan view, and the slits SL are formed in areas that overlap the electrodes 211F, 211H, and 211J as viewed in a plan view. In FIG. 20C, the barrier BR are formed in areas that overlap the electrodes 211B, 211J, and 211L as viewed in a plan view, and the slits SL are formed in areas that overlap the electrodes 211D, 211F, and 211H as viewed in a plan view.

In FIG. 20B indicating a state during the switching from the state of FIG. 20A to the state of FIG. 20C, in an area RD that overlaps the electrode 211D as viewed in a plan view, the barrier BR is switched to the slit SL, and in an area $R_J$ that overlaps the electrode 211J as viewed in a plan view, the slit SL is switched to the barrier BR. As illustrated in FIG. 20B, therefore, when the barrier lighting state is switched, an area whose size is twice the size of the barrier switching pitch Pe is under operation.

The response speed of liquid crystal when the voltage applied to the liquid crystal layer 23 decreases is slow, as compared with the response speed of liquid crystal when the voltage applied to the liquid crystal layer 23 increases. This is because the response speed of liquid crystal when an applied voltage is decreased is determined depending on physical properties of the liquid crystal, and to control the same is difficult. Therefore, a time required for the switching form the barrier BR to the slit SL is long as compared with a time required for the switching from the slit SL to the barrier BR.

This causes the width of the slit SL to be temporarily narrowed in the state illustrated in FIG. 20B. This causes luminance variation in some cases.

It is possible to, for example, make correction by driving the backlight by pulse width modulation so as to cancel luminance variation, or to make correction by adjusting the driving voltage timing of liquid crystal so as to reduce luminance variation. The luminance variation, however, is different depending on the position of the viewer, the ambient temperature, and the like, which makes the correction parameters complicated. Therefore, it is preferable to provide a configuration that does not cause luminance variation even in a case where response speeds of the liquid crystal layer 23 in the area $R_D$ and the area $R_J$ are different.

With these being taken into consideration together, the following requirements may be satisfied so that a stereoscopic image should be obtained that is capable of maintaining a state of smaller luminance variation and low crosstalk over a period before and after the barrier lighting state is switched: the width Wsl of the slit SL is equal to or greater than the width A of the opening over a period before and after the barrier lighting state is switched:

$$A \le Wsl - 2Pe$$

Similarly, the configuration should be such that the width Wbr of the barrier BR is equal to or greater than the width A of the opening over a period before and after the barrier lighting state is switched.

$$A \le Wbr - 2Pe$$

In the stereoscopic display device 1 according to the present embodiment, as described above, the value of Wsl, Wbr, and A are determined so as to satisfy the two expressions described above.

Figure 21A:
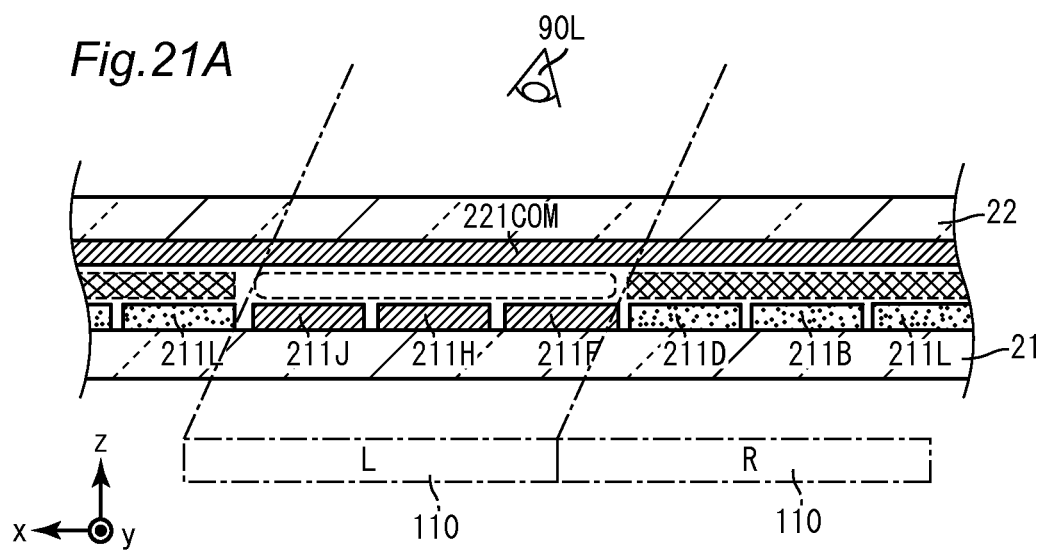
FIG. 21A schematically illustrates one of barrier lighting states.
Figure 21B:
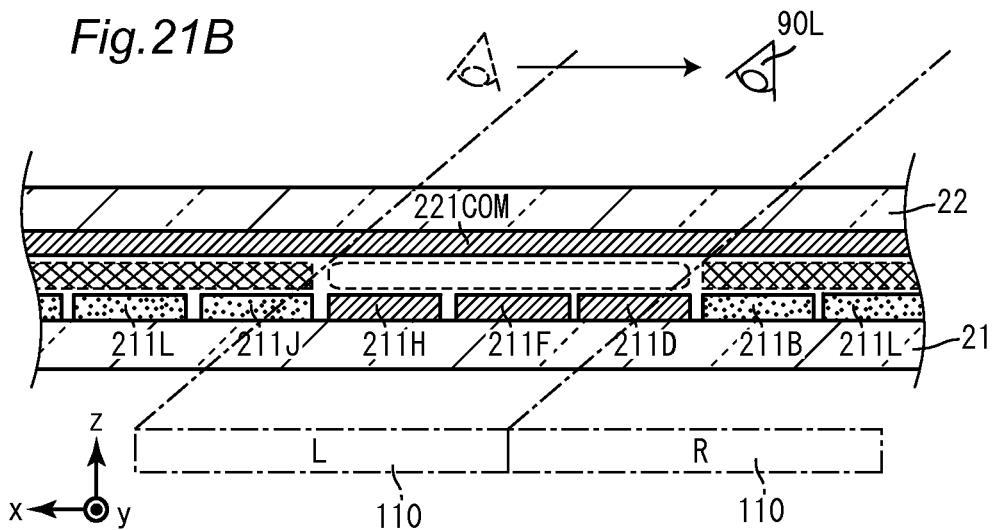
FIG. 21B schematically illustrates a state obtained after the viewer has moved and the barrier lighting state has been switched from the state illustrated in FIG. 21A.

The following description more specifically describes effects of the present embodiment, while referring to FIGS. 21A and 21B and FIGS. 22A to 22E. FIG. 21A schematically illustrates one of barrier lighting states. FIG. 21B schematically illustrates a state obtained after the viewer has moved from the state illustrated in FIG. 21A and the barrier lighting state has been switched.

Figure 22A:
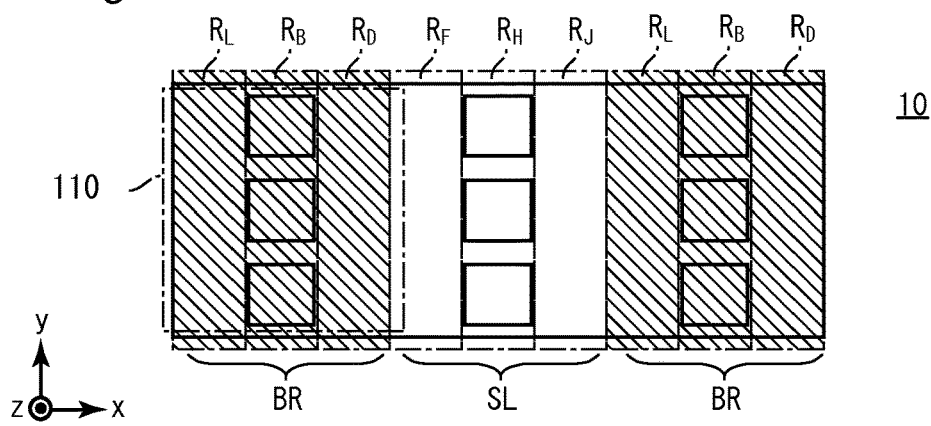
FIG. 22A schematically illustrates the relationship between the display panel viewed from the left eye, and the barriers and the slits, when the left eye is at the position illustrated in FIG. 21A.

FIG. 22A schematically illustrates the relationship between the display panel 10 viewed from the left eye 90L, and the barriers BR and the slits SL, when the left eye 90L is at the position illustrated in FIG. 21A. Among three rows of the pixels 110 aligned in the x direction, the pixel 110 positioned at the center displays a left-eye image, and the pixels 110 on the left and right sides thereto display a right-eye image.

An area RB in FIG. 22A indicates an area that overlaps the electrode 211B (see FIG. 21A) as viewed in a plan view. Similarly, areas $R_D$, $R_F$, $R_H$, $R_J$, and $R_L$ indicate areas that overlap the electrodes 211D, 211F, 211H, 211H, and 211L as viewed in a plan view. Further, areas where the barriers BR are formed are schematically indicated by hatching. The same applies to FIGS. 22B to 22E.

In FIG. 22A, only light from the pixels 110 displaying the right-eye image is blocked by the barriers BR. Light from the pixels 110 displaying the left-eye image is not blocked by the barriers BR. The luminance at this position, therefore, is 50% of that of the case where both of the left-eye image and the right-eye image are visible. Further, crosstalk is low.

Figure 22B:
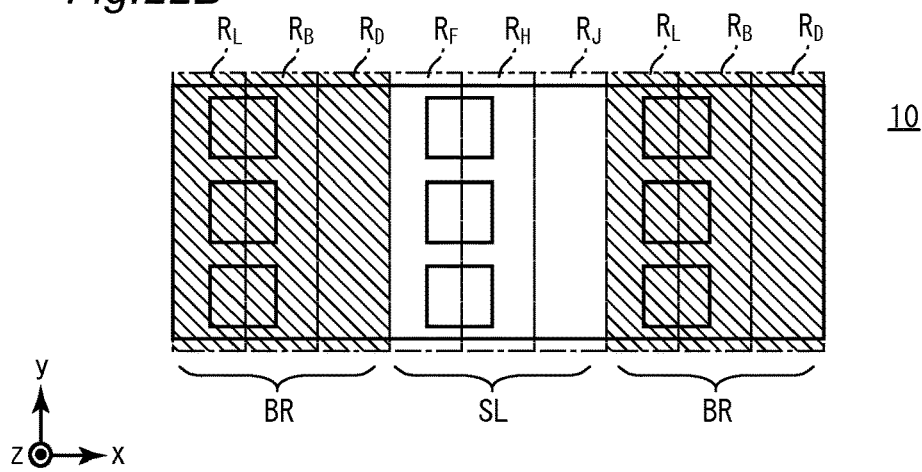
FIG. 22B schematically illustrates the relationship between the display panel viewed from the left eye, and the barriers and the slits, when the left eye is at an intermediate position between the position illustrated in FIG. 21A and the position illustrated in FIG. 21B and before the barrier lighting state is switched.

FIG. 22B schematically illustrates the relationship between the display panel 10 viewed from the left eye 90L, and the barriers BR and the slits SL, when the left eye 90L is at an intermediate position between the position illustrated in FIG. 21A and the position illustrated in FIG. 21B and before the barrier lighting state is switched. In FIG. 22B as well, only light from the pixels 110 displaying a right-eye image is blocked by the barriers BR.

Figure 22C:
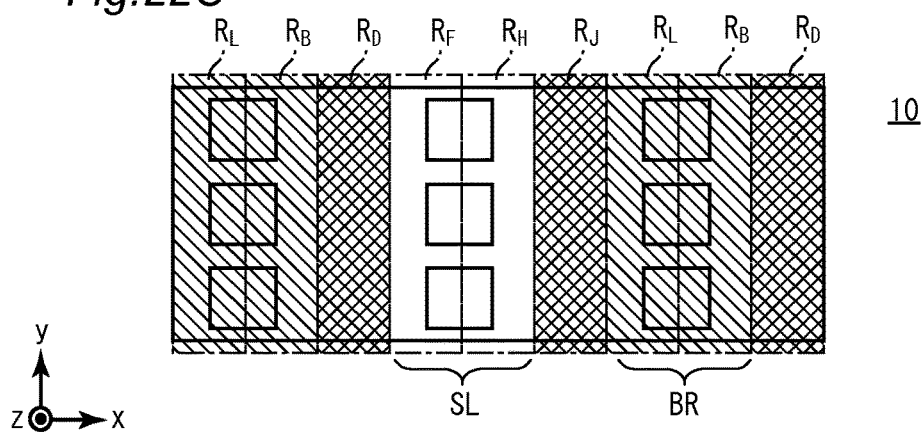
FIG. 22C schematically illustrates the relationship between the display panel viewed from the left eye, and the barriers and the slits, when the left eye is at an intermediate position between the position illustrated in FIG. 21A and the position illustrated in FIG. 21B and during the switching of the barrier lighting state.

FIG. 22C schematically illustrates the relationship between the display panel 10 viewed from the left eye 90L, and the barriers BR and the slits SL, when the left eye 90L is at an intermediate position between the position illustrated in FIG. 21A and the position illustrated in FIG. 21B and during the switching of the barrier lighting state.

In FIG. 22C, in the area RD, the barrier BR is switched to the slits SL, and in the area $R_J$, the slit SL is switched to the barrier BR. In FIG. 22C, the areas $R_D$ and $R_J$ are indicated by hatching that is different from the hatching for the barriers BR. As described above, as compared with the speed of switching from the slit SL to the barrier BR, the speed of switching from the barrier BR to the slit SL is slow. Therefore, the width of the slit SL becomes narrow temporarily here.

According to the present embodiment, even when the width of the slit SL becomes narrow, the width of the slit SL is greater than the width of the opening of the pixel 110. Therefore, in the state illustrated in FIG. 22C as well, only light from the pixels 110 displaying the right-eye image is blocked by the barriers BR.

Figure 22D:
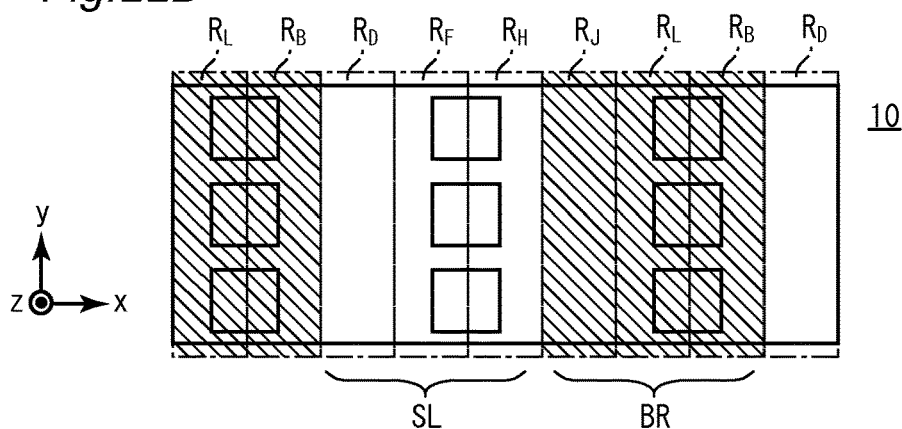
FIG. 22D schematically illustrates the relationship between the display panel viewed from the left eye, and the barriers and the slits, when the left eye is at an intermediate position between the position illustrated in FIG. 21A and the position illustrated in FIG. 21B and after the barrier lighting state is switched.

FIG. 22D schematically illustrates the relationship between the display panel 10 viewed from the left eye 90L, and the barriers BR and the slits SL, when the left eye 90L is at an intermediate position between the position illustrated in FIG. 21A and the position illustrated in FIG. 21B and after the barrier lighting state is switched. In FIG. 22D as well, light from the pixels 110 displaying the right-eye image is blocked by the barriers BR.

Figure 22E:
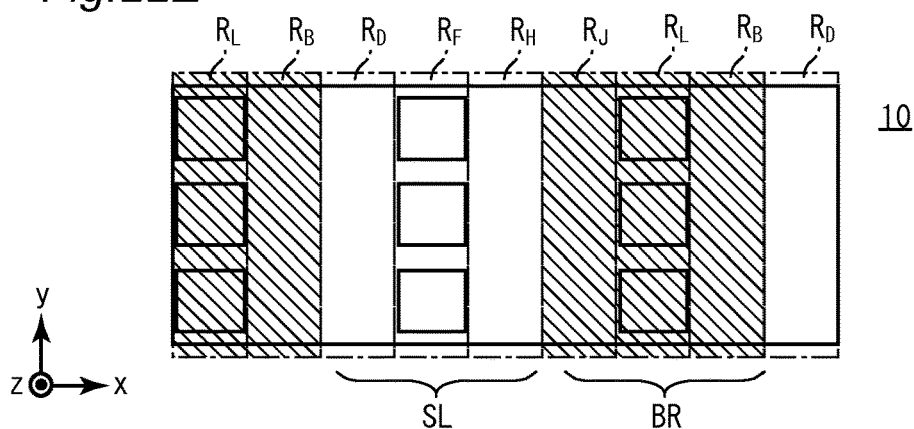
FIG. 22E schematically illustrates the relationship between the display panel viewed from the left eye, and the barriers and the slits, when the left eye is at the position illustrated in FIG. 21B.

FIG. 22E schematically illustrates the relationship between the display panel 10 viewed from the left eye 90L, and the barriers BR and the slits SL, when the left eye 90L is at the position illustrated in FIG. 21B. In FIG. 22E as well, light from the pixels 110 displaying the right-eye image is blocked by the barriers BR.

In this way, according to the present embodiment, the state in which luminance variation is small and crosstalk is low can be maintained over a period before and after the barrier lighting state is switched, i.e., over a period between the states illustrated in FIGS. 22A to 22E.

[Comparative Example]

Here, the following description describes a virtual comparative example for explaining effects of the present embodiment.

Figure 23:
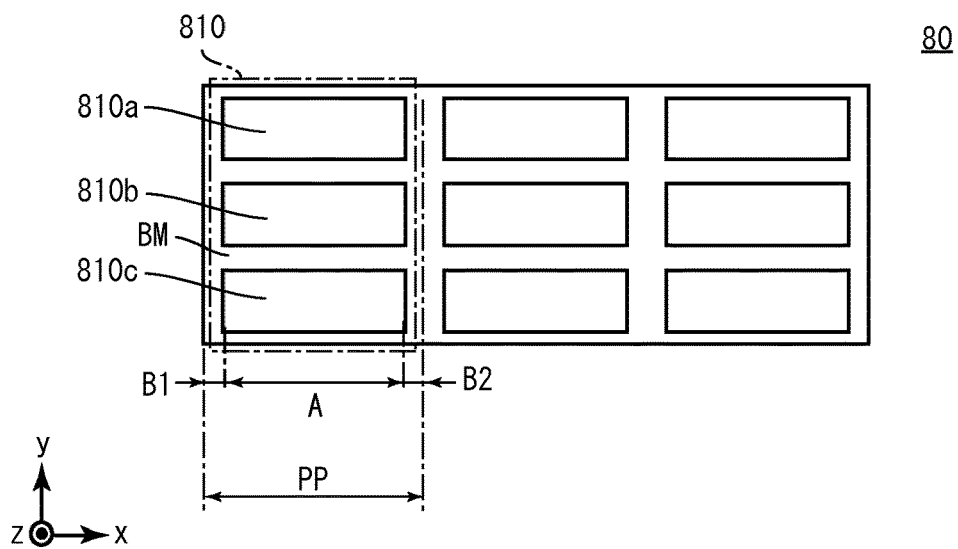
FIG. 23 is a view for explaining a configuration of pixels of a display panel of a stereoscopic display device according to a comparative example.
Figure 24:
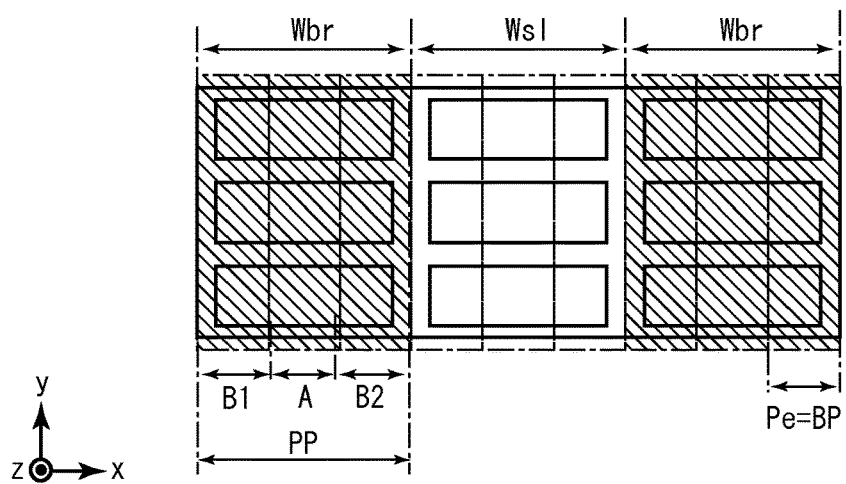
FIG. 24 schematically illustrates the relationship between the pixels, and barriers and slits formed by the switch liquid crystal panel.

A stereoscopic display device according to the Comparative Example includes a display panel 80 in the place of the display panel 10. The display panel 80 includes pixels 810 in the place of the pixels 110. FIG. 23 is a view for explaining a configuration of the pixels 810 of the display panel 80. FIG. 24 schematically illustrates the relationship between the pixels 810, and barriers BR and slits SL formed by the switch liquid crystal panel 20.

The pixel 810 includes three subpixels 810a, 810b, and 810c arranged in the y direction, and a black matrix BM formed therebetween, as is the case with the pixel 110. The pixel 810 and the pixel 110 are different regarding the width A of the opening. More specifically, the width A of the opening of the pixel 810 is greater than Wsl−2Pe.

The following description discusses luminance variation and crosstalk of the stereoscopic display device when the state illustrated in FIG. 21A is switched to the state illustrated in FIG. 21B, as is the case with the First Embodiment.

Figure 25A:
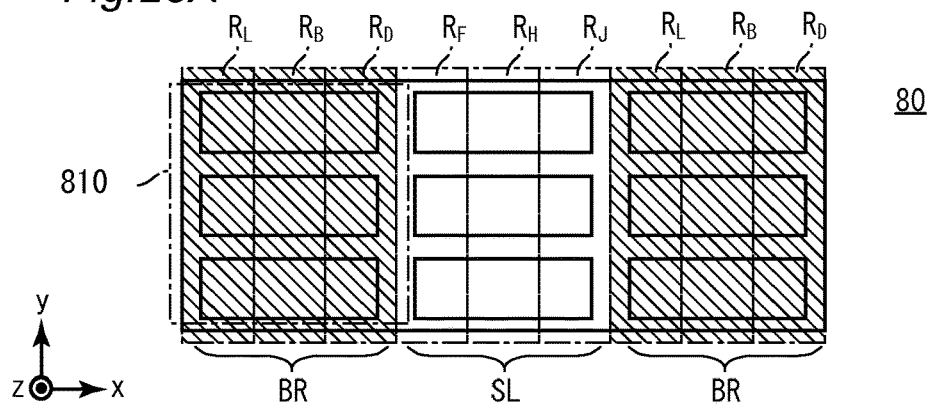
FIG. 25A schematically illustrates the relationship between the display panel viewed from the left eye, and the barriers and the slits, when the left eye is at the position illustrated in FIG. 21A.

FIG. 25A schematically illustrates the relationship between the display panel 80 viewed from the left eye 90L, and the barriers BR and the slits SL, when the left eye 90L is at the position illustrated in FIG. 21A. Among three rows of the pixels 810 aligned in the x direction, the pixel 810 positioned at the center displays a left-eye image, and the pixels 810 on the left and right sides thereto display a right-eye image. In FIG. 25A, only light from the pixels 810 displaying the right-eye image is blocked by the barriers BR.

Figure 25B:
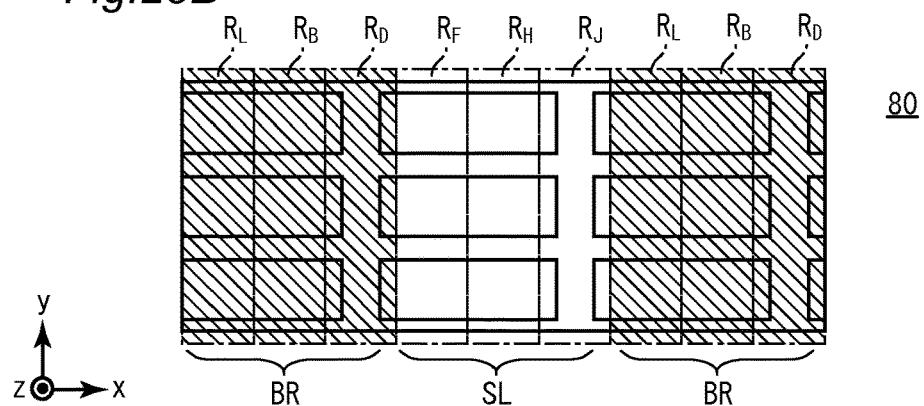
FIG. 25B schematically illustrates the relationship between the display panel viewed from the left eye, and the barriers and the slits, when the left eye is at an intermediate position between the position illustrated in FIG. 21A and the position illustrated in FIG. 21B and before the barrier lighting state is switched.

FIG. 25B schematically illustrates the relationship between the display panel 80 viewed from the left eye 90L, and the barriers BR and the slits SL, when the left eye 90L is at an intermediate position between the position illustrated in FIG. 21A and the position illustrated in FIG. 21B and before the barrier lighting state is switched. In FIG. 25B, a part of light from the pixels 810 displaying the right-eye image is not blocked by the barriers BR. This causes crosstalk to increase.

Figure 25C:
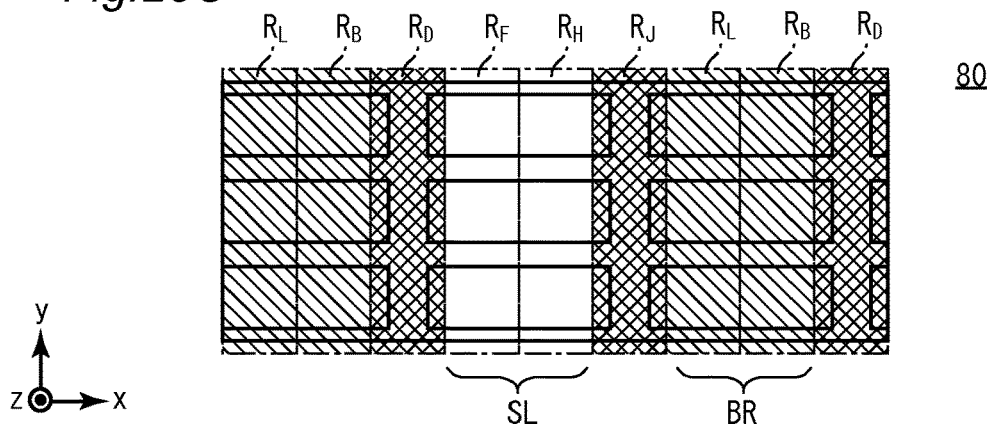
FIG. 25C schematically illustrates the relationship between the display panel viewed from the left eye, and the barriers and the slits, when the left eye is at an intermediate position between the position illustrated in FIG. 21A and the position illustrated in FIG. 21B and during the switching of the barrier lighting state.

FIG. 25C schematically illustrates the relationship between the display panel 80 viewed from the left eye 90L, and the barriers BR and the slits SL, when the left eye 90L is at an intermediate position between the position illustrated in FIG. 21A and the position illustrated in FIG. 21B and during the switching of the barrier lighting state. As is the case with the First Embodiment, here, the width of the slit LS temporarily becomes narrow. Therefore, a part of light from the pixels 810 displaying the left-eye image is blocked by the barriers BR. This causes luminance to temporarily decrease.

Figure 25D:
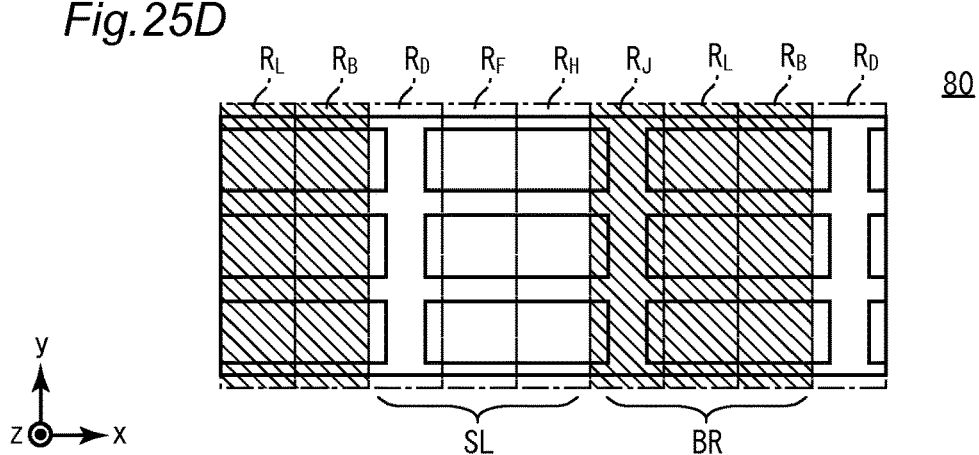
FIG. 25D schematically illustrates the relationship between the display panel viewed from the left eye, and the barriers and the slits, when the left eye is at an intermediate position between the position illustrated in FIG. 21A and the position illustrated in FIG. 21B and after the barrier lighting state is switched.

FIG. 25D schematically illustrates the relationship between the display panel 80 viewed from the left eye 90L, and the barriers BR and the slits SL, when the left eye 90L is at an intermediate position between the position illustrated in FIG. 21A and the position illustrated in FIG. 21B and after the barrier lighting state is switched. In FIG. 25D, a part of light from the pixels 810 displaying the right-eye image is not blocked by the barriers BR. This causes crosstalk to increase.

Figure 25E:
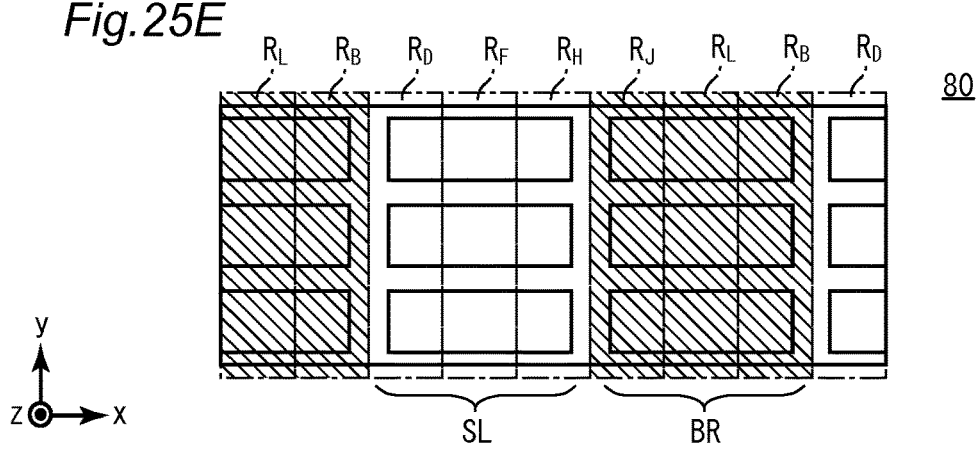
FIG. 25E schematically illustrates the relationship between the display panel viewed from the left eye, and the barriers and the slits, when the left eye is at the position illustrated in FIG. 21B.

FIG. 25E schematically illustrates the relationship between the display panel 80 viewed from the left eye 90L, and the barriers BR and the slits SL, when the left eye is at the position illustrated in FIG. 21B. In FIG. 25E, only light from the pixels 110 displaying the right-eye image is blocked by the barriers BR.

As described above, in the stereoscopic display device according to the Comparative Example, there exists an area where luminance variation occurs, and further, crosstalk increases, over a period before and after the barrier lighting state is switched, i.e., over a period between the states illustrated in FIGS. 25A to 25E. As compared with a stereoscopic display device according to the Comparative Example, the stereoscopic display device 1 according to the present embodiment is capable of maintaining a state where luminance variation is small and crosstalk is low over a period before and after the barrier lighting state is switched.

The foregoing description describes the stereoscopic display device 1 according to the First Embodiment of the present invention. As the present embodiment, an example is described wherein the first electrode group 211 is composed of 6 types of electrodes. This configuration is a mere example, and the number of electrodes composing the first electrode group 211 is arbitrary.

[The Second Embodiment]

Figure 26:
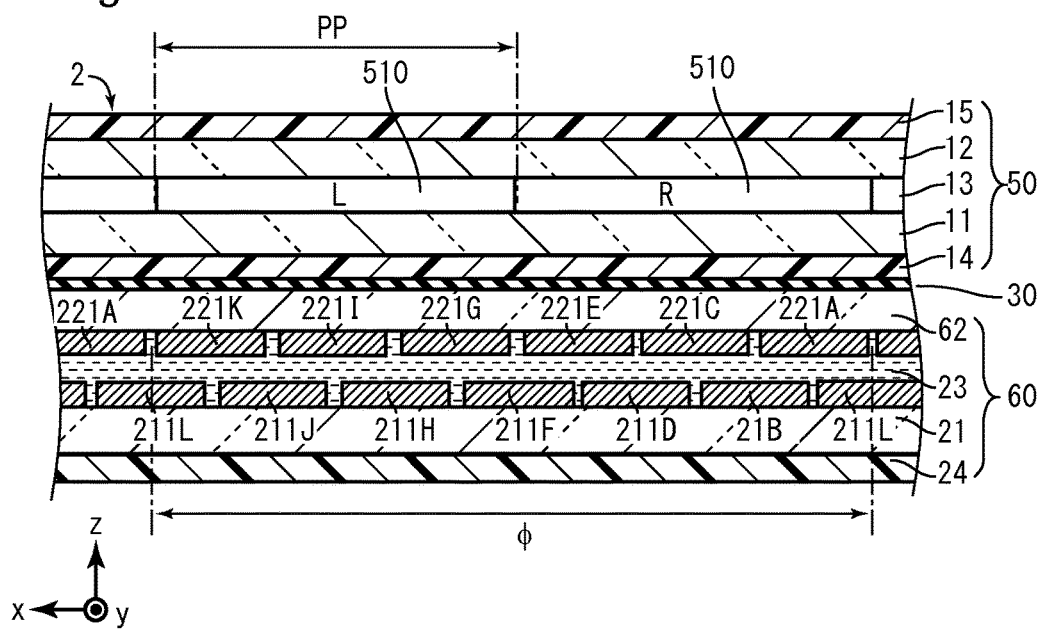
FIG. 26 is a cross-sectional view illustrating a schematic configuration of a stereoscopic display device according to the Second Embodiment of the present invention.

FIG. 26 is a cross-sectional view illustrating a schematic configuration of a stereoscopic display device 2 according to the Second Embodiment of the present invention. The stereoscopic display device 2 includes a display panel 50 in the place of the display panel 10, and includes a switch liquid crystal panel 60 in the place of the switch liquid crystal panel 20.

The display panel 50 includes pixels 510 in the place of the pixels 110. The configuration of the pixel 510 is to be described below.

Figure 27:
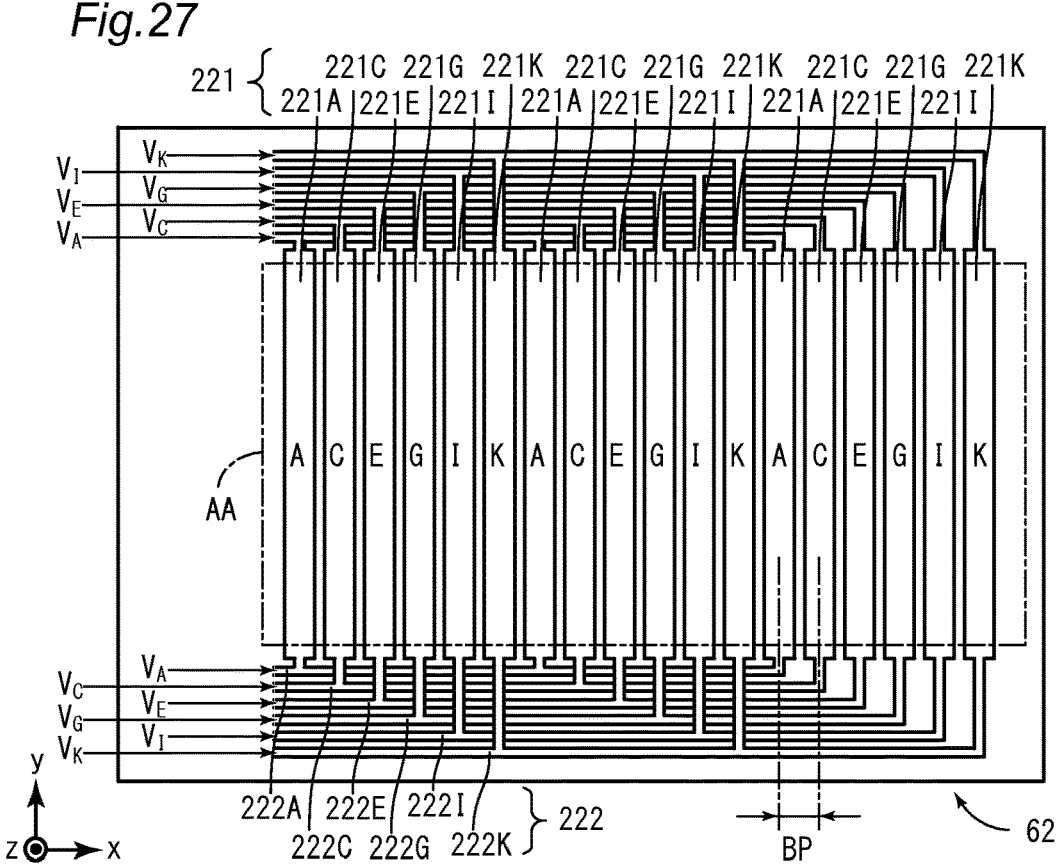
FIG. 27 is a plan view illustrating a configuration of a second substrate.

The switch liquid crystal panel 60 includes a second substrate 62 in the place of the second substrate 22. FIG. 27 is a plan view illustrating a configuration of a second substrate 62. On the second substrate 62, a second electrode group 221 is formed in the place of the common electrode 221COM. The second electrode group 221 includes a plurality of electrodes that are arranged in the x direction at an electrode pitch BP. The plurality of electrodes extend in the y direction each, and are arranged so as to be parallel with one another.

On the second substrate 62, further, a line group 222 is formed, which is electrically connected to the second electrode group 221. The line group 222 is preferably formed outside an active area AA.

To the second electrode group 221, signals of six systems, that is, signals $V_A$, $V_C$, $V_E$, $V_G$, $V_I$, and $V_K$ are supplied from the control unit 40 via the line group 222. As is the case with the first electrode group 211, electrodes to which the signals $V_A$, $V_C$, $V_E$, $V_G$, $V_I$, and $V_K$ are supplied are referred to as "electrodes 221A, 221C, 221E, 221G, 221I, and 221K", respectively. Further, lines electrically connected to the electrodes 221A, 221C, 221E, 221G, 221I, and 221K are referred to as "lines 222A, 222C, 222E, 222G, 222I, and 222K", respectively.

As is the case with the first electrode group 211, the electrodes 221A, 221C, 221E, 221G, 221I, and 221K are arranged in the x direction in this order cyclically.

The second substrate 62 can be produced in the same manner as that for the first substrate 21 explained with reference to FIGS. 8A to 8C.

Figure 28:
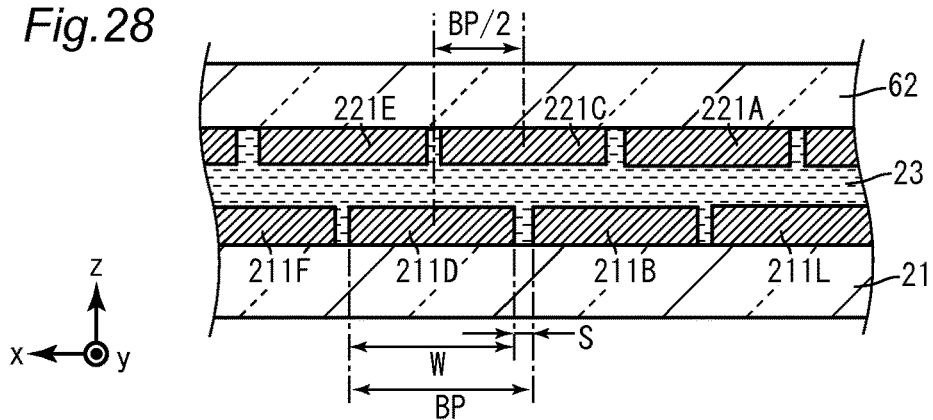
FIG. 28 is an enlarged cross-sectional view illustrating a part of the switch liquid crystal panel.

FIG. 28 is an enlarged cross-sectional view illustrating a part of the switch liquid crystal panel 60. As illustrated in FIG. 28, the first electrode group 211 and the second electrode group 221 are arranged with deviation with respect to each other in the x direction. It is preferable that the first electrode group 211 and the second electrode group 221 are arranged with deviation for half of the electrode pitch BP with respect to each other in the x direction, as is the case with the example illustrated in FIG. 28.

[Method for Driving Switch Liquid Crystal Panel 60]

Figure 29:
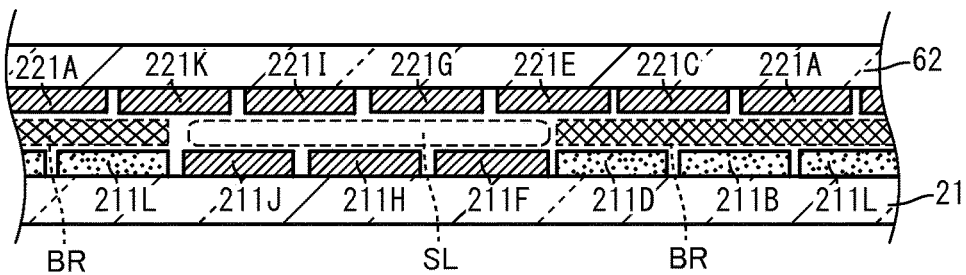
FIG. 29 is a cross-sectional view schematically illustrating one of barrier lighting states of the switch liquid crystal panel.
Figure 30A:
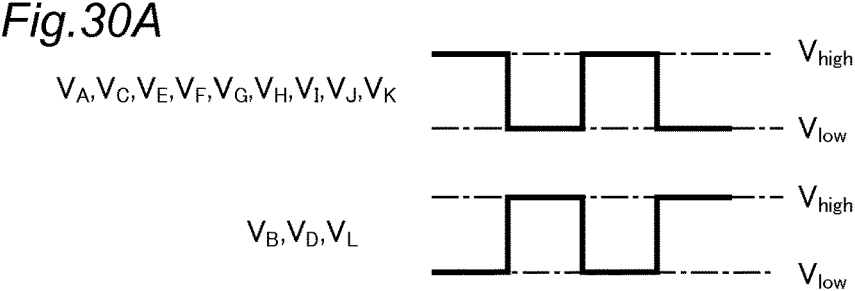
FIG. 30A illustrates exemplary waveforms of signals $V_A$ to $V_L$ supplied to respective electrodes so as to turn the switch liquid crystal panel into the barrier lighting state illustrated in FIG. 29.

FIG. 29 is a cross-sectional view schematically illustrating one of barrier lighting states of the switch liquid crystal panel 60. FIG. 30A illustrates exemplary waveforms of signals $V_A$ to $V_L$ supplied to respective electrodes so as to turn the switch liquid crystal panel 60 into the barrier lighting state illustrated in FIG. 29.

The control unit 40 drives, with a first phase, a part of electrodes included in one electrode group selected from the first electrode group 211 and the second electrode group 221, and drives the other electrode with a second phase having a polarity opposite to that of the first phase. FIG. 29 schematically illustrates the electrodes driven with the first phase, by denoting the same with a sandy pattern.

In the example illustrated in FIG. 30A, the control unit 40 applies a rectangular alternating-current voltage to the electrodes 211B, 211D, 211L included in the first electrode group 211 in the first phase, and to the other electrodes (the electrodes 211H, 211H, and 211J as well as the electrodes 221A to 221K) in the second phase.

As illustrated in FIG. 30A, the signals $V_A$ to $V_L$ preferably have the same amplitude. In the example illustrated in FIG. 30A, the signals $V_A$ to $V_L$ have either a predetermined high-level potential ($V_{high}$, for example, 5 V) and a predetermined low-level potential (Vim, for example, 0 V).

This causes a potential difference of $|V_{high}-V_{low}|$ to occur between the electrode 221A and the electrode 211B, and liquid crystal molecules in the liquid crystal layer 23 between the electrode 221A and the electrode 211B are aligned in the z direction. The liquid crystal of the switch liquid crystal panel 20 is normally white liquid crystal, as is the case with the switch liquid crystal panel 60. Therefore, the barrier BR is formed in a portion where the electrode 221A and the electrode 211B overlap as viewed in a plan view (the xy plan view).

Similarly, the barriers BR are formed in a portion where the electrode 211B and the electrode 221C overlap, a portion where the electrode 221C and the electrode 211D overlap, a portion where the electrode 211D and the electrode 221E overlap, a portion where the electrode 221K and the electrode 211L overlap, and a portion where the electrode 211L and the electrode 221A overlap, as viewed in a plan view.

On the other hand, no potential difference occurs to between the electrode 221E and the electrode 211F. As described above, the liquid crystal of the switch liquid crystal panel 60 is normally white liquid crystal. Therefore, the slit SL is formed in a portion where the electrode 221E and the electrode 211F overlap as viewed in a plan view.

Similarly, the slits SL are formed in a portion where the electrode 211F and the electrode 221G overlap, a portion where the electrode 221G and the electrode 211H overlap, a portion where the electrode 211H and the electrode 221I overlap, a portion where the electrode 221I and the electrode 211J overlap, a portion where the electrode 211J and the electrode 221K overlap, as viewed in a plan view.

As a result, the barriers BR are formed in the portions that overlap the electrodes 211B, 211D, and 211L driven with the first phase as viewed in a plan view, and the slits SL are formed in the portions that overlap the electrodes 211F, 211H, and 211J as viewed in a plan view.

Figure 30B:
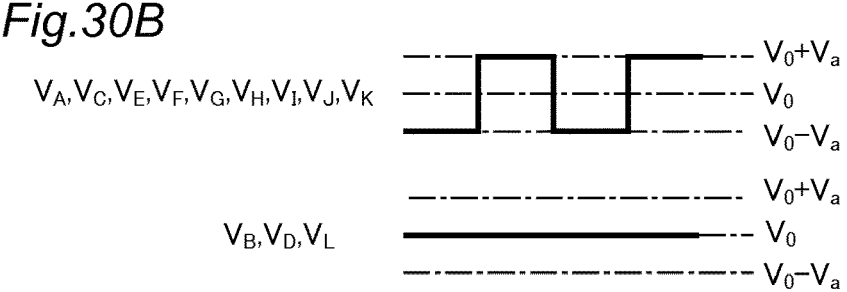
FIG. 30B illustrates other exemplary waveforms of the signals $V_A$ to $V_L$ supplied to respective electrodes so as to turn the switch liquid crystal panel into the barrier lighting state illustrated in FIG. 29.

FIG. 30B illustrates other exemplary waveforms of the signals $V_A$ to $V_L$ supplied to respective electrodes so as to turn the switch liquid crystal panel 60 into the barrier lighting state illustrated in FIG. 29.

In the example illustrated in FIG. 30B, the control unit 40 sets the electrodes 211B, 211D, and 211L included in the first electrode group 211 to a constant potential $V_0$ (for example, GND), and applies a rectangular alternating-current voltage that alternates with a half amplitude of $V_a$ (for example, $V_a$=5V) with respect to a potential of $V_0$, to the other electrodes (the electrodes 211H, 211H, and 211J, as well as the electrodes 221A to 221K).

This causes a potential difference of $|V_a|$ to occur in the portions overlapping the electrodes 211B, 211D, and 211L as viewed in a plan view, thereby causing the barriers BR to be formed. On the other hand, no potential difference occurs in the portions overlapping the electrodes 211F, 211H, and 211J as viewed in a plan view, thereby causing the slits SL to be formed therein.

Figure 30C:
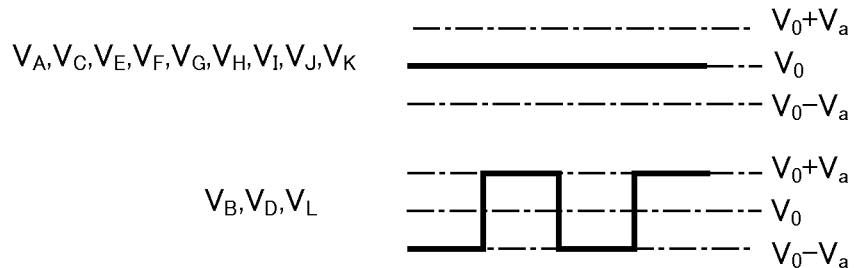
FIG. 30C illustrates still other exemplary waveforms of the signal $V_A$ to $V_L$ supplied to respective electrodes so as to turn the switch liquid crystal panel into the barrier lighting state illustrated in FIG. 29.

FIG. 30C illustrates still other exemplary waveforms of the signal $V_A$ to $V_L$ supplied to respective electrodes so as to turn the switch liquid crystal panel 60 into the barrier lighting state illustrated in FIG. 29.

In the example illustrated in FIG. 30C, the control unit 40 applies a rectangular alternating-current voltage that alternates with a half amplitude of $V_a$ (for example, $V_a$=5V) with respect to a potential of $V_0$, to the electrodes 211B, 211D, and 211L included in the first electrode group 211, and sets the other electrodes (the electrodes 211H, 211H, and 211J, as well as the electrodes 221A to 221K) to a constant potential $V_0$ (for example, GND).

This causes a potential difference of $|V_a|$ to occur in the portions overlapping the electrodes 211B, 211D, and 211L as viewed in a plan view, thereby causing the barriers BR to be formed. On the other hand, no potential difference occurs in the portions overlapping the electrodes 211F, 211H, and 211J as viewed in a plan view, thereby causing the slits SL to be formed therein.

Figure 31:
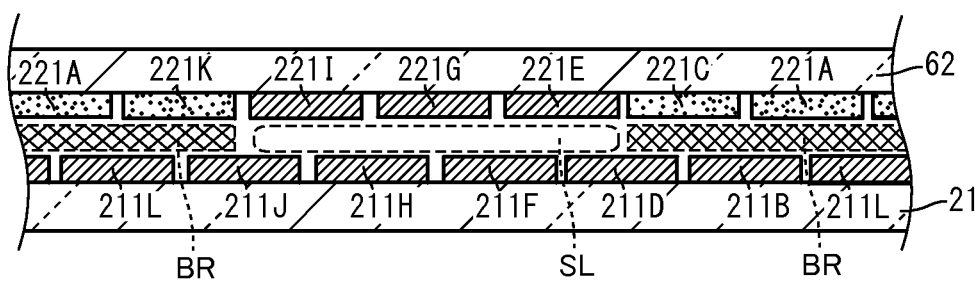
FIG. 31 is a cross-sectional view schematically illustrating another barrier lighting state of the switch liquid crystal panel.
Figure 32A:
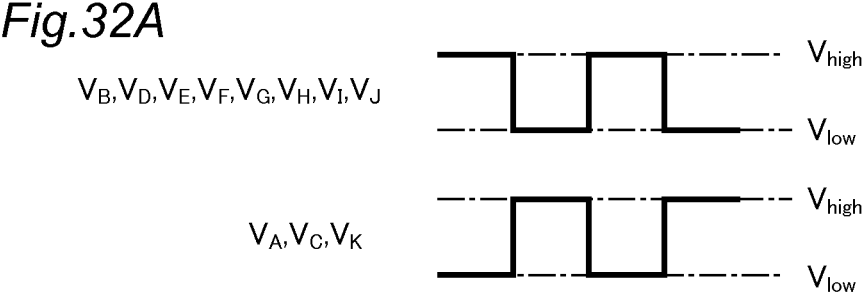
FIG. 32A illustrates exemplary waveforms of signals $V_A$ to $V_L$ supplied to respective electrodes so as to turn the switch liquid crystal panel into the barrier lighting state illustrated in FIG. 31.
Figure 32B:
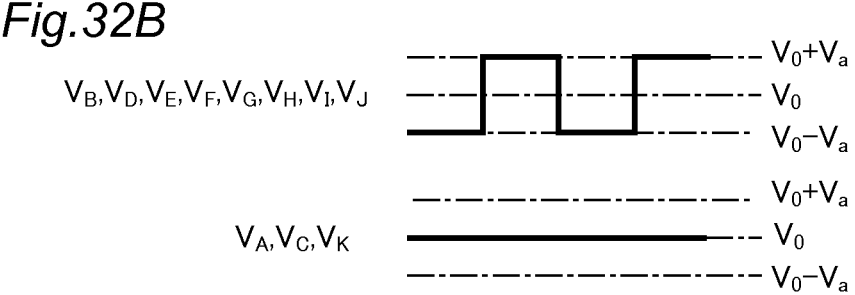
FIG. 32B illustrates other exemplary waveforms of the signals $V_A$ to $V_L$ supplied to respective electrodes so as to turn the switch liquid crystal panel into the barrier lighting state illustrated in FIG. 31.
Figure 32C:
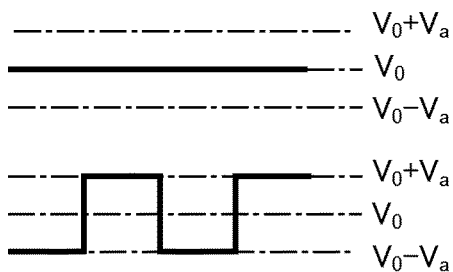
FIG. 32C illustrates still other exemplary waveforms of the signals $V_A$ to $V_L$ supplied to respective electrodes so as to turn the switch liquid crystal panel into the barrier lighting state illustrated in FIG. 31.

FIG. 31 is a cross-sectional view schematically illustrating another barrier lighting state of the switch liquid crystal panel 60. FIGS. 32A to 32C illustrate exemplary waveforms of signals $V_A$ to $V_L$ supplied to respective electrodes so as to turn the switch liquid crystal panel 60 into the barrier lighting state illustrated in FIG. 31. The descriptions regarding FIGS. 32A to 32C, which are identical to those regarding FIGS. 30A to 30C, are omitted herein.

As is clear from comparison of FIG. 29 with FIG. 31, with the configuration of the switch liquid crystal panel 60, it is possible to control the barrier lighting state by using half of the electrode pitch BP as a minimum unit.

[Configuration of Pixel 510 of Display Panel 50]

Figure 33:
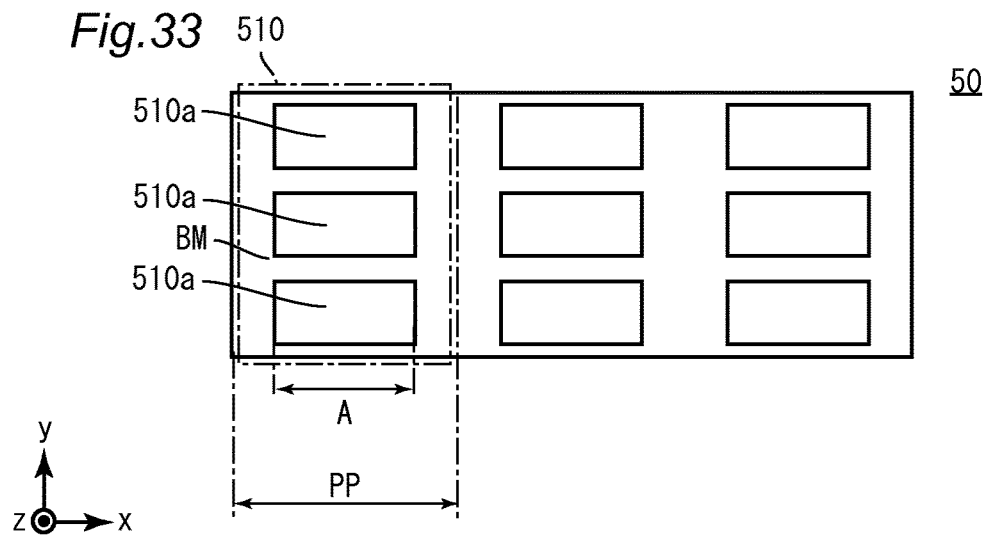
FIG. 33 is a view for explaining a configuration of a pixel of a display panel.

FIG. 33 is a view for explaining a configuration of a pixel 510 of a display panel 50. The pixel 510, as is the case with the pixel 110, includes three subpixels 510a, 510b, and 510c arranged in the y direction, and a black matrix BM formed therebetween.

Figure 34:
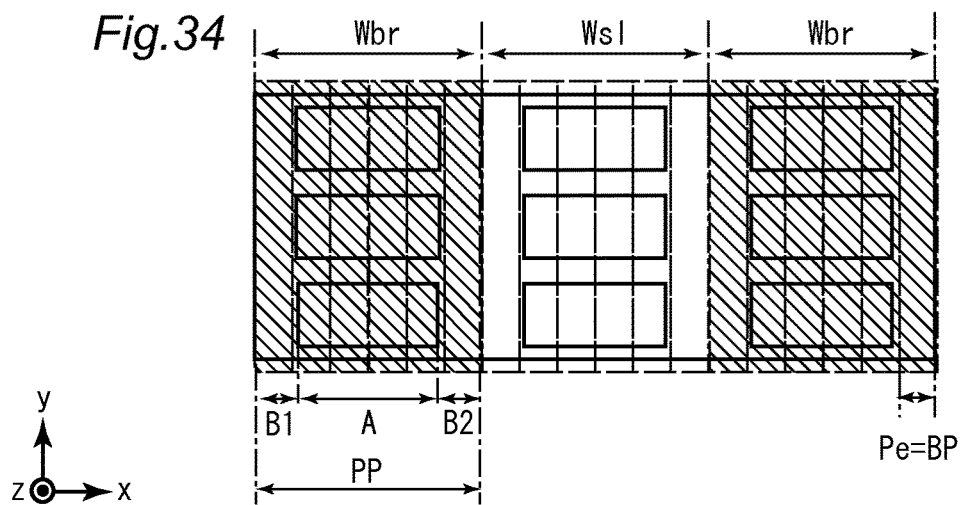
FIG. 34 schematically illustrates the relationship between the pixels, and barriers and slits formed by the switch liquid crystal panel.

FIG. 34 schematically illustrates the relationship between the pixels 510, and barriers BR and slits SL formed by the switch liquid crystal panel 60. In the present embodiment as well, the control unit 40 controls the barrier lighting state of the switch liquid crystal panel 60 so that Wbr≈Wsl is satisfied.

In the present embodiment as well, Wsl, Wbr, and A satisfy the relationship given as the following expressions:

$$A \le Wsl - 2Pe, \text{ and}$$

$$A \le Wbr - 2Pe$$

where A is a width of an opening of the pixel 510 in the alignment direction of the barriers BR (the x direction).

Figure 35A:
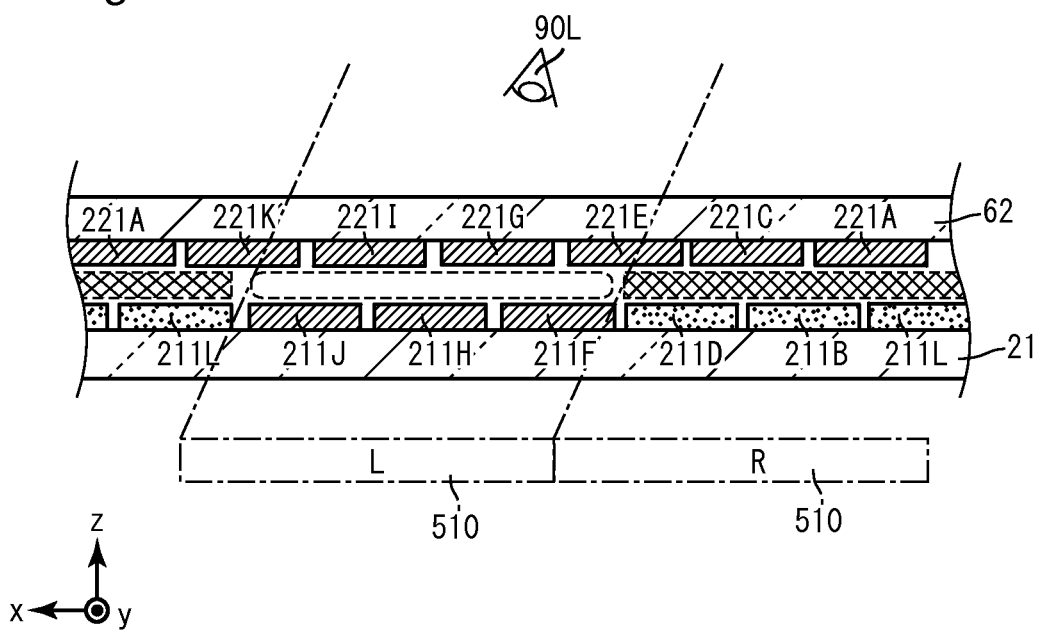
FIG. 35A schematically illustrates one of barrier lighting states.
Figure 35B:
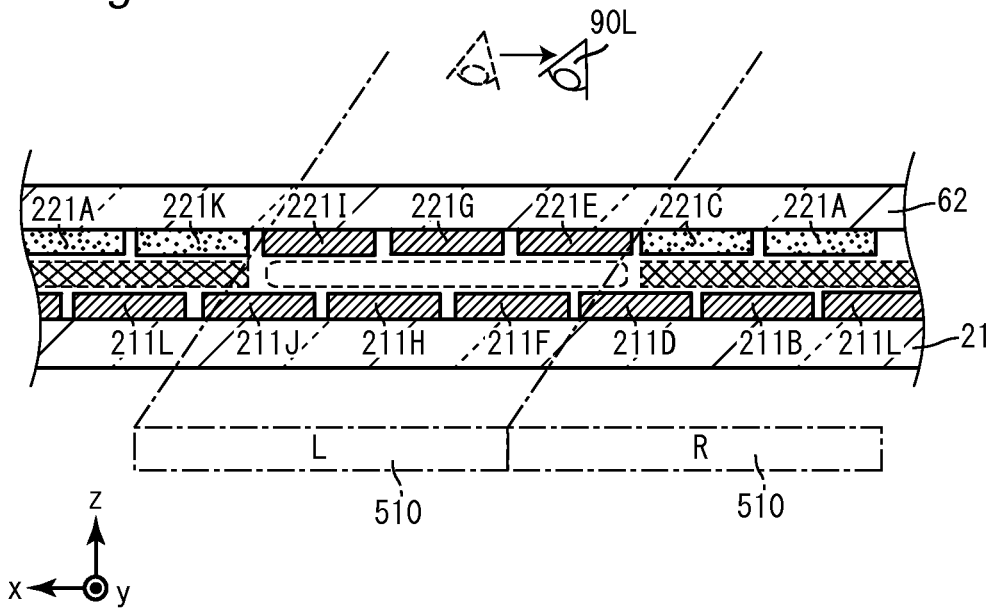
FIG. 35B schematically illustrates a state obtained after the viewer has moved from the state illustrated in FIG. 35A and the barrier lighting state has been switched.

The following description more specifically describes the effects of the present embodiment, while referring to FIGS. 35A and 35B as well as FIGS. 36A to 36E. FIG. 35A schematically illustrates one of barrier lighting states. FIG. 35B schematically illustrates a state obtained after the viewer has moved from the state illustrated in FIG. 35A and the barrier lighting state has been switched.

Figure 36A:
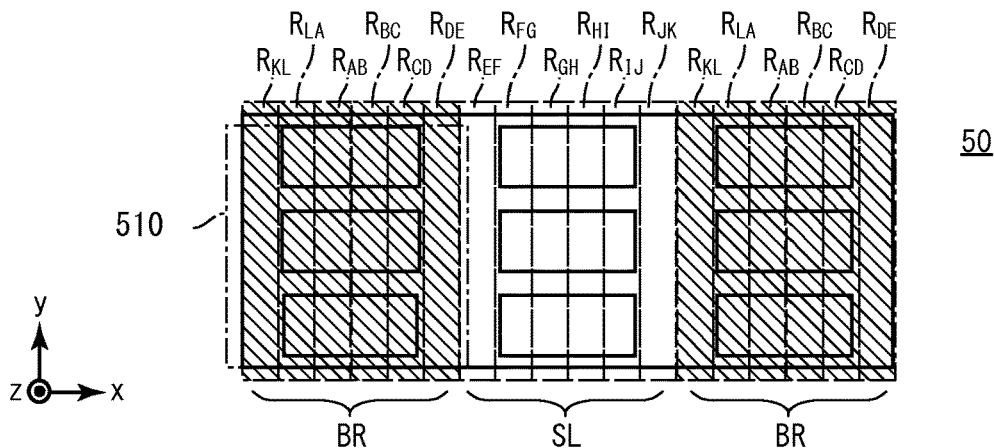
FIG. 36A schematically illustrates the relationship between the display panel viewed from the left eye, and the barriers and the slits, when the left eye is at the position illustrated in FIG. 35A.

FIG. 36A schematically illustrates the relationship between the display panel 50 viewed from the left eye 90L, and the barriers BR and the slits SL, when the left eye 90L is at the position illustrated in FIG. 35A. Among three rows of the pixels 510 aligned in the x direction, the pixel 510 positioned at the center displays a left-eye image, and the pixels 510 on the left and right sides thereto display a right-eye image.

An area $R_{AB}$ in FIG. 36A indicates an area where the electrode 221A and the electrode 211B overlap as viewed in a plan view. Similarly, areas $R_{BC}$, $R_{CD}$, $R_{DE}$, $R_{EF}$, $R_{FG}$, $R_{GH}$, $R_{HI}$, $R_{IJ}$, $R_{JK}$, $R_{KL}$, and $R_{LA}$, indicate an area where the electrode 211B and the electrode 221C overlap, an area where the electrode 221C and the electrode 211D overlap, an area where the electrode 211D and the electrode 221E overlap, an area where the electrode 221E and the electrode 211F overlap, an area where the electrode 211F and the electrode 221G overlap, an area where the electrode 221G and the electrode 211H overlap, an area where the electrode 211H and the electrode 221I overlap, an area where the electrode 221I and the electrode 211J overlap, an area where the electrode 211J and the electrode 221K overlap, an area where the electrode 221K and the electrode 211L overlap, and an area where the electrode 211L and the electrode 221A overlap, respectively, as viewed in a plan view. Further, areas where the barriers BR are formed are schematically indicated by hatching. The same applies to FIGS. 36B to 36E.

In FIG. 36A, only light from the pixels 510 right-eye image displaying the right-eye image is blocked by the barriers BR. Light from the pixels 510 displaying the left-eye image is not blocked by the barriers BR. The luminance at this position, therefore, is 50% of that of the case where both of the left-eye image and the right-eye image are visible. Further, crosstalk is low.

Figure 36B:
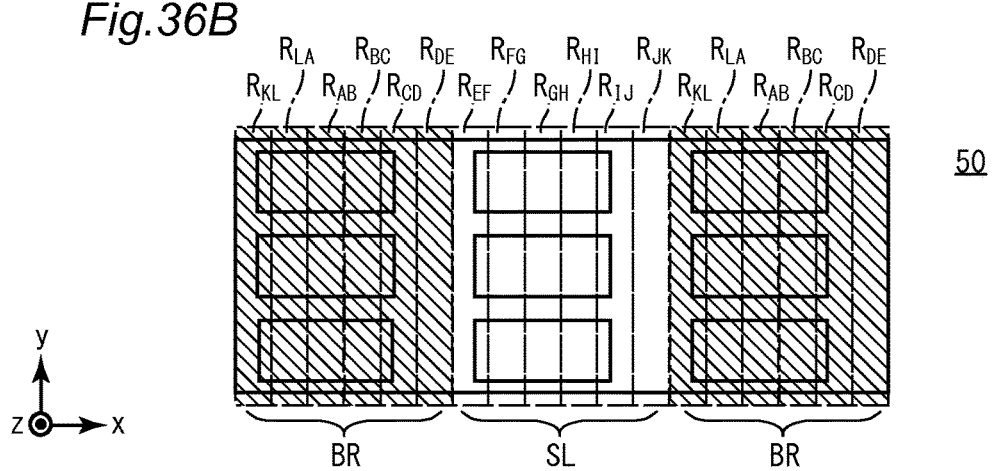
FIG. 36B schematically illustrates the relationship between the display panel viewed from the left eye, and the barriers and the slits, when the left eye is at an intermediate position between the position illustrated in FIG. 35A and the position illustrated in FIG. 35B and before the barrier lighting state is switched.

FIG. 36B schematically illustrates the relationship between the display panel 50 viewed from the left eye 90L, and the barriers BR and the slits SL, when the left eye 90L is at an intermediate position between the position illustrated in FIG. 35A and the position illustrated in FIG. 35B and before the barrier lighting state is switched. In FIG. 36B as well, only light from the pixels 510 displaying a right-eye image is blocked by the barriers BR.

Figure 36C:
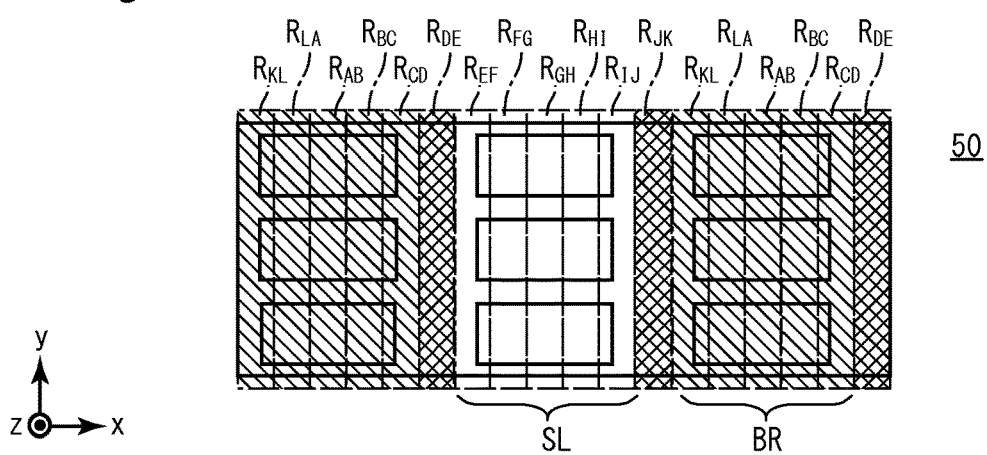
FIG. 36C schematically illustrates the relationship between the display panel viewed from the left eye, and the barriers and the slits, when the left eye is at an intermediate position between the position illustrated in FIG. 35A and the position illustrated in FIG. 35B and during the switching of the barrier lighting state.

FIG. 36C schematically illustrates the relationship between the display panel 50 viewed from the left eye 90L, and the barriers BR and the slits SL, when the left eye 90L is at an intermediate position between the position illustrated in FIG. 35A and the position illustrated in FIG. 35B and during the switching of the barrier lighting state.

In FIG. 36C, in the area $R_{DE}$, the barrier BR is switched to the slit SL, and in the area $R_{JK}$, the slit SL is switched to the barrier BR. In FIG. 36C, the areas $R_{DE}$ and $R_{JK}$ are indicated by hatching that is different from the hatching for the barriers BR. As described above, as compared with the speed of switching from the slit SL to the barrier BR, the speed of switching from the barrier BR to the slit SL is slow. Therefore, the width of the slit SL becomes narrow temporarily here.

According to the present embodiment, even when the width of the slit SL becomes narrow, the width of the slit SL is equal to or greater than the width of the opening of the pixel 510. Therefore, in the state illustrated in FIG. 36C as well, only light from the pixels 510 displaying the right-eye image is blocked by the barriers BR.

Figure 36D:
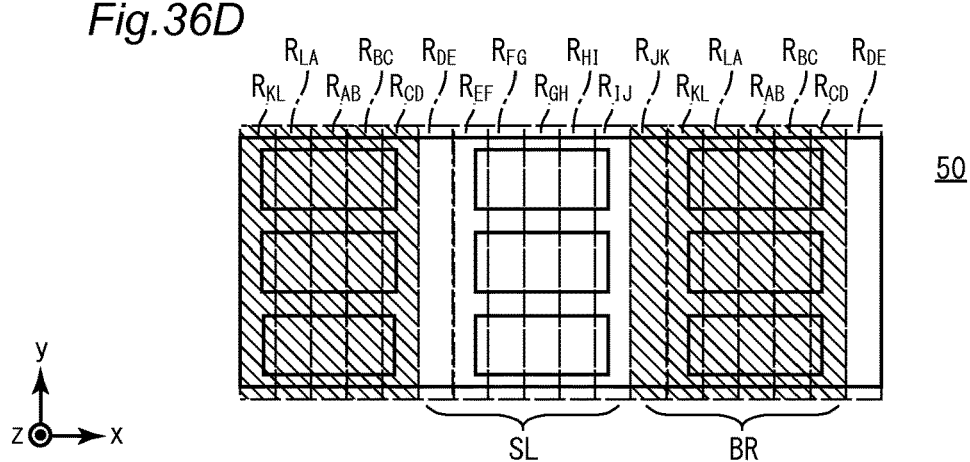
FIG. 36D schematically illustrates the relationship between the display panel viewed from the left eye, and the barriers and the slits, when the left eye is at an intermediate position between the position illustrated in FIG. 35A and the position illustrated in FIG. 35B and after the barrier lighting state is switched.

FIG. 36D schematically illustrates the relationship between the display panel 50 viewed from the left eye 90L, and the barriers BR and the slits SL, when the left eye 90L is at an intermediate position between the position illustrated in FIG. 35A and the position illustrated in FIG. 35B and after the barrier lighting state is switched. In FIG. 36D as well, light from the pixels 510 displaying the right-eye image is blocked by the barriers BR.

Figure 36E:
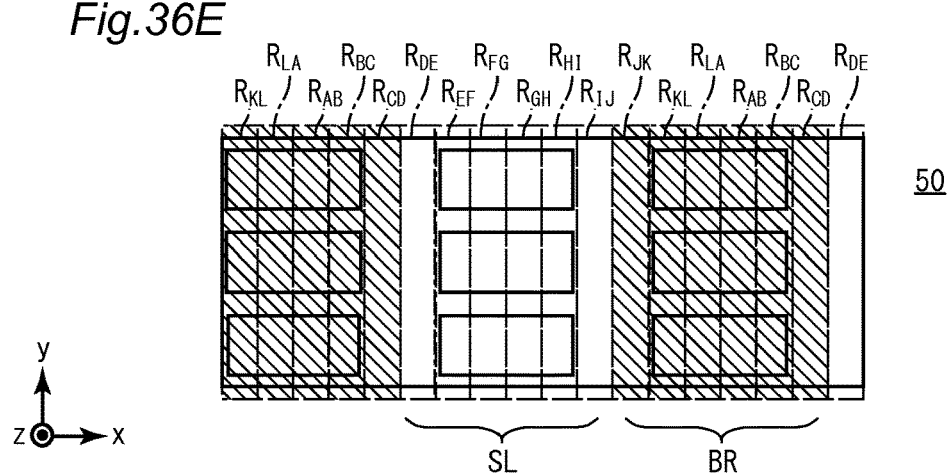
FIG. 36E schematically illustrates the relationship between the display panel viewed from the left eye, and the barriers and the slits, when the left eye is at the position illustrated in FIG. 35B.

FIG. 36E schematically illustrates the relationship between the display panel 50 viewed from the left eye 90L, and the barriers BR and the slits SL, when the left eye 90L is at the position illustrated in FIG. 35B. In FIG. 36E as well, light from the pixels 510 displaying the right-eye image is blocked by the barriers BR.

In this way, according to the present embodiment as well, the state in which luminance variation is small and crosstalk is low can be maintained over a period before and after the barrier lighting state is switched, i.e., over a period between the states illustrated in FIGS. 36A to 36E.

With the present embodiment, it is possible to make the barrier switching pitch Pe smaller than the electrode pitch BP. This allows the barrier lighting state to be switched more finely, thereby keeping crosstalk at a lower level.

Further, as is clear from comparison between FIG. 11 and FIG. 33, when the barrier switching pitch Pe is made smaller, the width A of the opening is made larger, which allows the display panel to have higher luminance.

[Modification Example of Second Embodiment]

The foregoing description explains a case where the control unit 40 controls the barrier lighting state of the switch liquid crystal panel 60 so that the width Wbr of the barrier BR and the width Wsl of the slit SL are equal to each other. The width Wbr of the barrier BR and the width Wsl of the slit SL, however, may be different from each other.

A stereoscopic display device according to one modification example of the present embodiment includes a display panel 52 in the place of the display panel 50. The display panel 52 includes pixels 520 in the place of the pixels 510.

Figure 37:
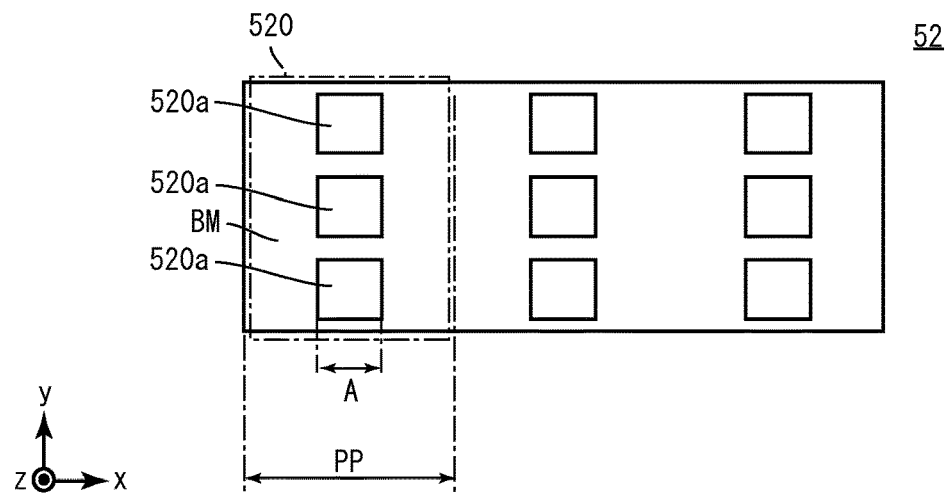
FIG. 37 is a view for explaining a configuration of pixels of a display panel of a stereoscopic display device according to one modification example of the Second Embodiment of the present invention.

FIG. 37 is a view for explaining a configuration of the pixel 520 of the display panel 52. The pixel 520 includes three subpixels 520a, 520b, and 520c arranged in the y direction, and a black matrix BM formed therebetween, as is the case with the pixel 110.

Figure 38:
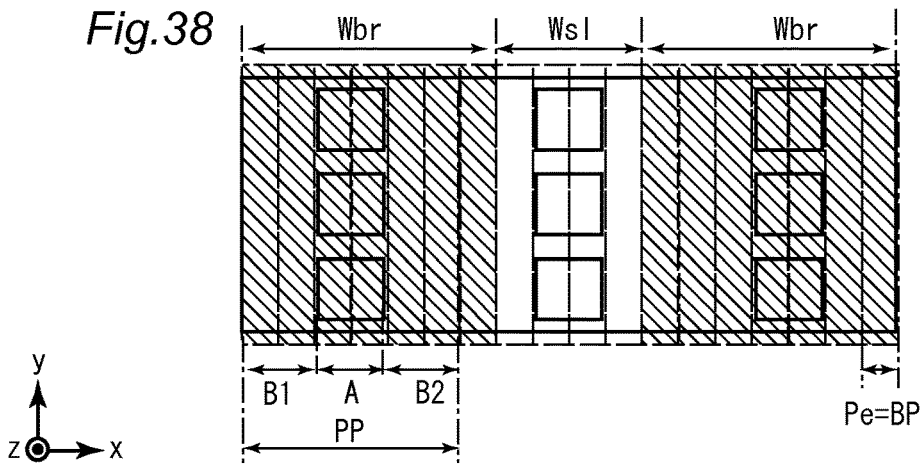
FIG. 38 schematically illustrates the relationship between the pixels, and barriers and slits formed by the switch liquid crystal panel.

FIG. 38 schematically illustrates the relationship between the pixels 520, and barriers BR and slits SL formed by the switch liquid crystal panel 60. In the present modification example, the control unit 40 controls the barrier lighting state of the switch liquid crystal panel 60 so that Wbr>Wsl is satisfied.

In the present modification example as well, Wsl, Wbr, and A satisfy the relationship given as the following expressions:

$$A \leq Wsl - 2Pe, \text{ and}$$

$$A \leq Wbr - 2Pe$$

where A is a width of an opening of the pixel 520 in the alignment direction of the barriers BR (the x direction).

Figure 39A:
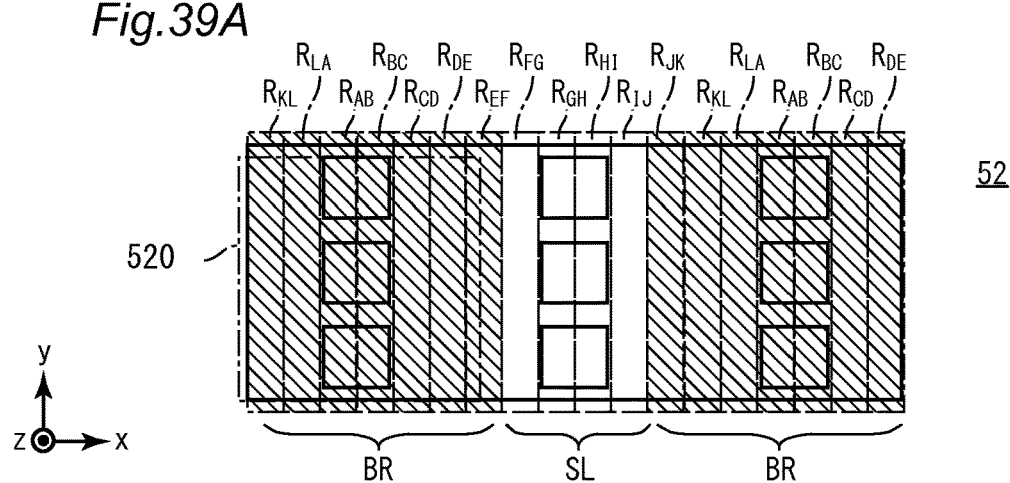
FIG. 39A schematically illustrates the relationship between the display panel viewed from the left eye, and the barriers and the slits, when the left eye is at the position illustrated in FIG. 35A.
Figure 39B:
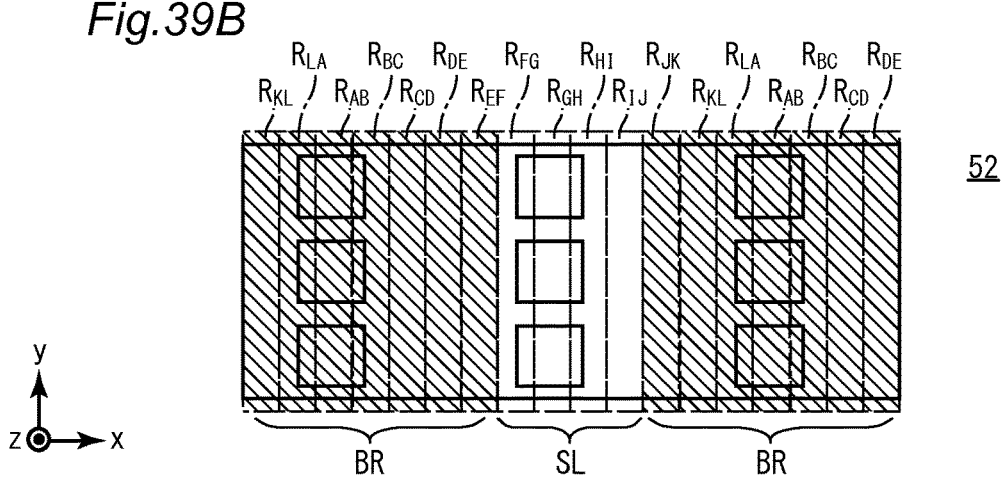
FIG. 39B schematically illustrates the relationship between the display panel viewed from the left eye, and the barriers and the slits, when the left eye is at an intermediate position between the position illustrated in FIG. 35A and the position illustrated in FIG. 35B and before the barrier lighting state is switched.
Figure 39C:
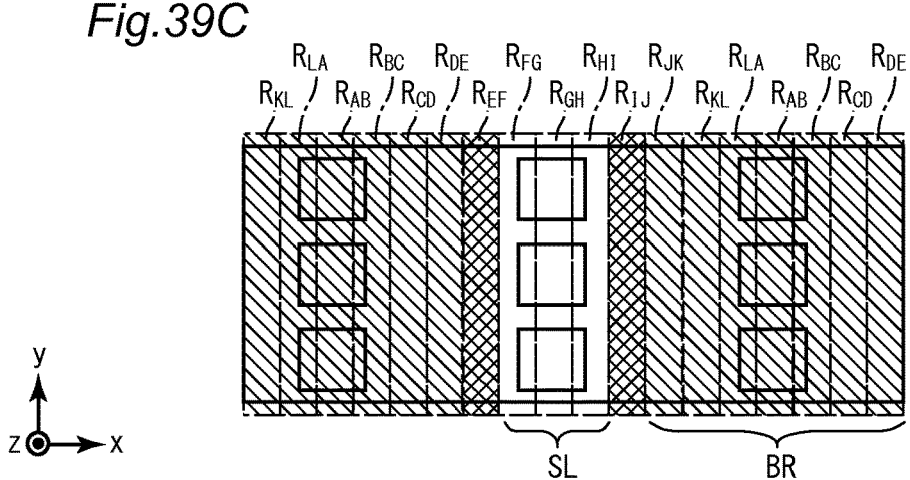
FIG. 39C schematically illustrates the relationship between the display panel viewed from the left eye, and the barriers and the slits, when the left eye is at an intermediate position between the position illustrated in FIG. 35A and the position illustrated in FIG. 35B and during the switching of the barrier lighting state.
Figure 39D:
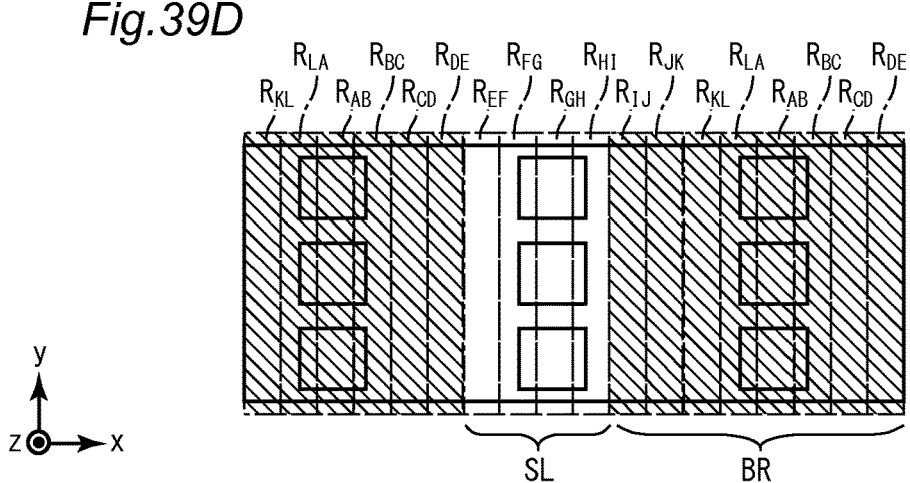
FIG. 39D schematically illustrates the relationship between the display panel viewed from the left eye, and the barriers and the slits, when the left eye is at an intermediate position between the position illustrated in FIG. 35A and the position illustrated in FIG. 35B and after the barrier lighting state is switched.
Figure 39E:
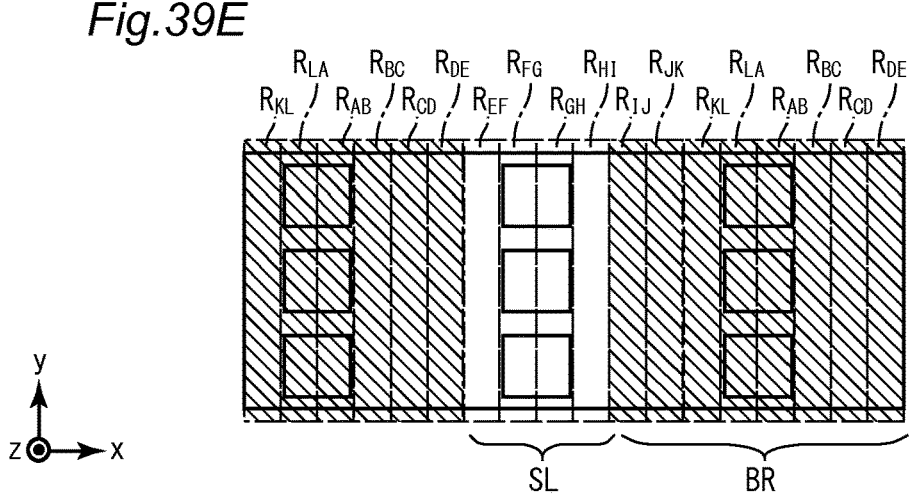
FIG. 39E schematically illustrates the relationship between the display panel viewed from the left eye, and the barriers and the slits, when the left eye is at the position illustrated in FIG. 35B.

FIG. 39A schematically illustrates the relationship between the display panel 52 viewed from the left eye 90L, and the barriers BR and the slits SL, when the left eye 90L is at the position illustrated in FIG. 35A. FIG. 39B schematically illustrates the relationship between the display panel 52 viewed from the left eye 90L, and the barriers BR and the slits SL, when the left eye 90L is at an intermediate position between the position illustrated in FIG. 35A and the position illustrated in FIG. 35B and before the barrier lighting state is switched. FIG. 39C schematically illustrates the relationship between the display panel 52 viewed from the left eye 90L, and the barriers BR and the slits SL, when the left eye 90L is at an intermediate position between the position illustrated in FIG. 35A and the position illustrated in FIG. 35B and during the switching of the barrier lighting state. FIG. 39D schematically illustrates the relationship between the display panel 52 viewed from the left eye 90L, and the barriers BR and the slits SL, when the left eye 90L is at an intermediate position between the position illustrated in FIG. 35A and the position illustrated in FIG. 35B and after the barrier lighting state is switched. FIG. 39E schematically illustrates the relationship between the display panel 52 viewed from the left eye 90L, and the barriers BR and the slits SL, when the left eye 90L is at the position illustrated in FIG. 35B.

According to the present modification example as well, the state in which luminance variation is small and crosstalk is low can be maintained over a period before and after the barrier lighting state is switched, i.e., over a period between the states illustrated in FIGS. 39A to 39E.

A stereoscopic display device according to another modification example of the present embodiment includes a display panel 53 in the place of the display panel 50. The display panel 53 includes pixels 530 in the place of the pixels 510.

Figure 40:
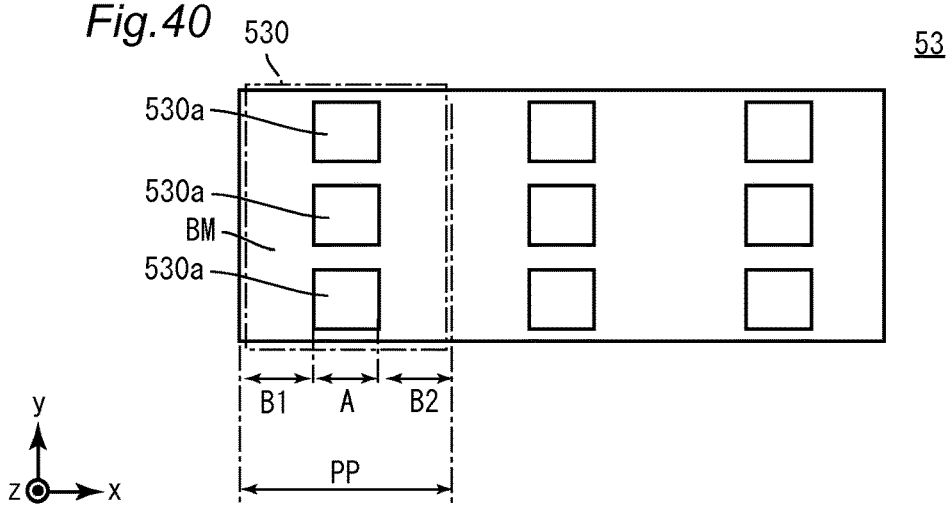
FIG. 40 is a view for explaining a configuration of pixels of a display panel of a stereoscopic display device according to another modification example of the Second Embodiment of the present invention.

FIG. 40 is a view for explaining a configuration of the pixels 530 of the display panel 53. The pixel 530, as is the case with the pixel 110, includes three subpixels 530a, 530b, and 530c arranged in the y direction, and a black matrix BM formed therebetween.

Figure 41:
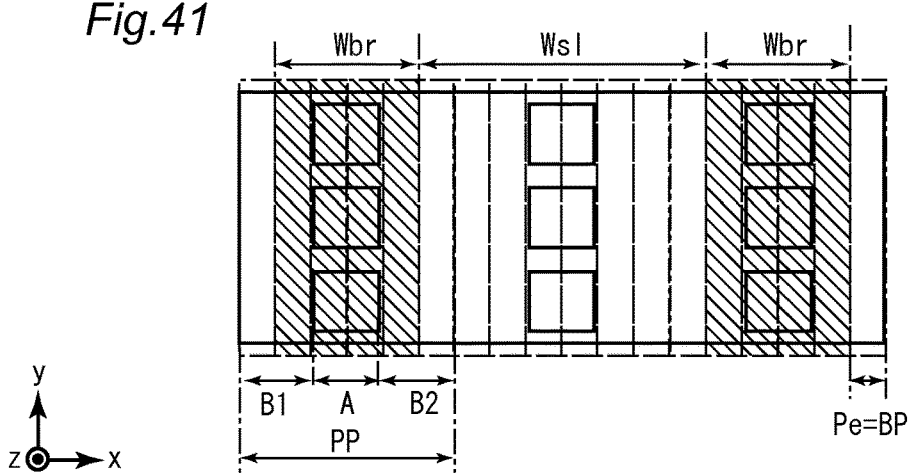
FIG. 41 schematically illustrates the relationship between the pixels, and barriers and slits formed by the switch liquid crystal panel.

FIG. 41 schematically illustrates the relationship between the pixels 530, and barriers BR and slits SL formed by the switch liquid crystal panel 60. In the present modification example, the control unit 40 controls the barrier lighting state of the switch liquid crystal panel 60 so that Wbr<Wsl is satisfied.

In the present modification example as well, Wsl, Wbr, and A satisfy the relationship given as the following expressions:

$$A \leq Wsl - 2Pe, \text{ and}$$

$$A \leq Wbr - 2Pe$$

where A is a width of an opening of the pixel 530 in the alignment direction of the barriers BR (the x direction).

Figure 42A:
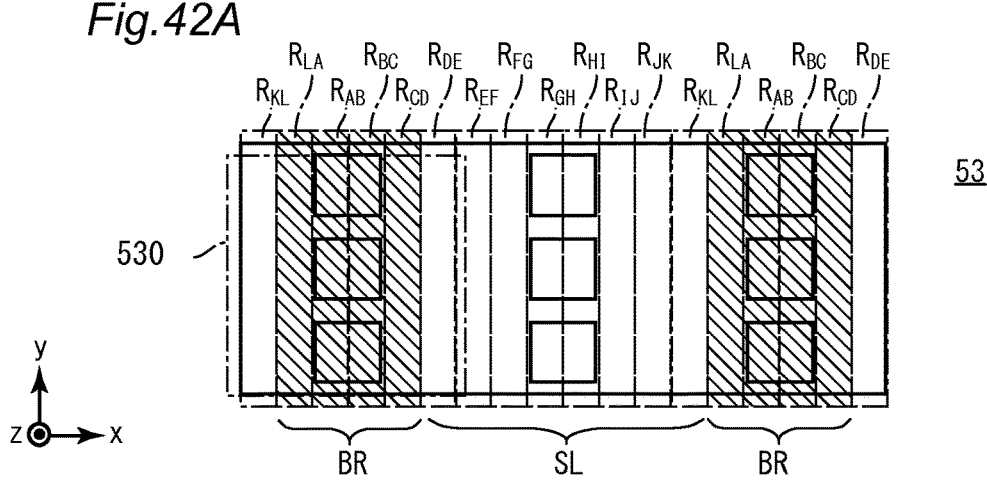
FIG. 42A schematically illustrates the relationship between the display panel viewed from the left eye, and the barriers and the slits, when the left eye is at the position illustrated in FIG. 35A.
Figure 42B:
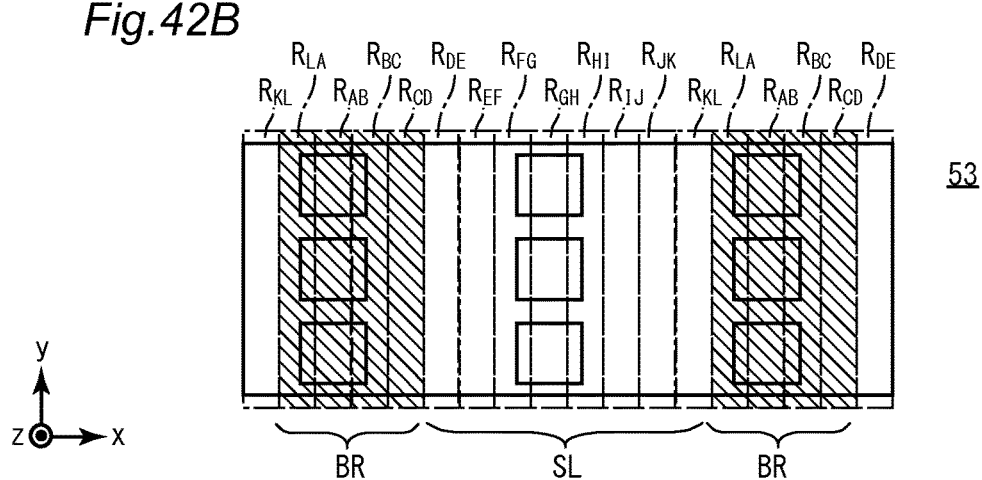
FIG. 42B schematically illustrates the relationship between the display panel viewed from the left eye, and the barriers and the slits, when the left eye is at an intermediate position between the position illustrated in FIG. 35A and the position illustrated in FIG. 35B and before the barrier lighting state is switched.
Figure 42C:
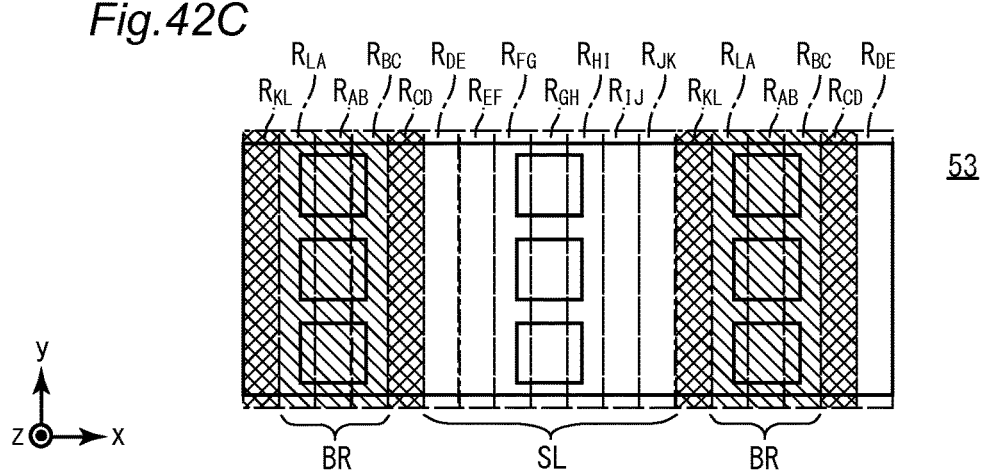
FIG. 42C schematically illustrates the relationship between the display panel viewed from the left eye, and the barriers and the slits, when the left eye is at an intermediate position between the position illustrated in FIG. 35A and the position illustrated in FIG. 35B and during the switching of the barrier lighting state.
Figure 42D:
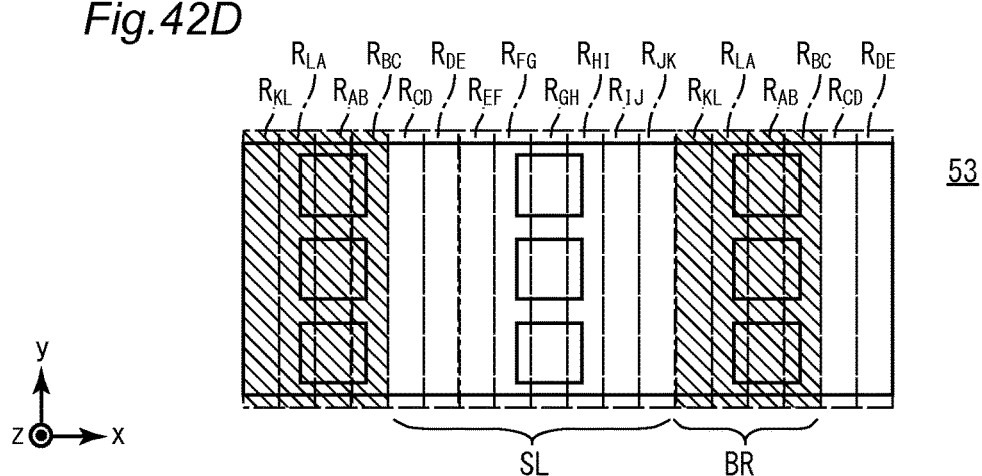
FIG. 42D schematically illustrates the relationship between the display panel viewed from the left eye, and the barriers and the slits, when the left eye is at an intermediate position between the position illustrated in FIG. 35A and the position illustrated in FIG. 35B and after the barrier lighting state is switched.
Figure 42E:
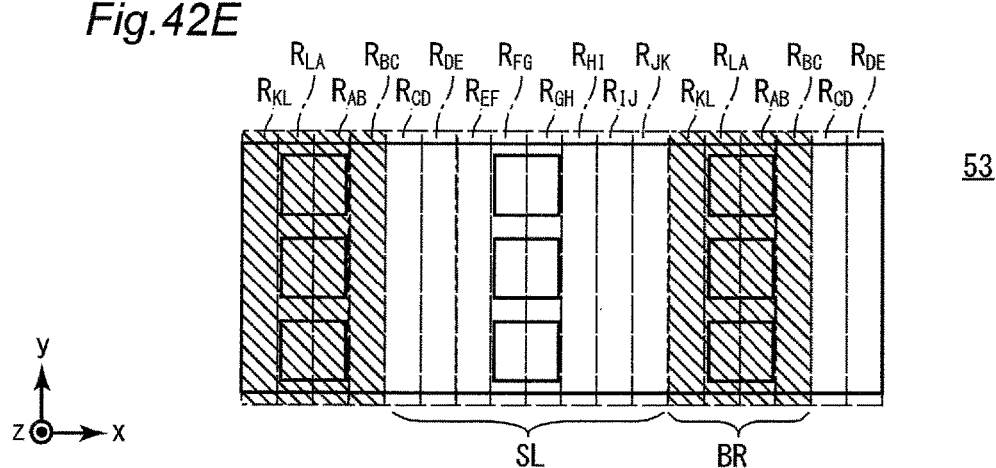
FIG. 42E schematically illustrates the relationship between the display panel viewed from the left eye, and the barriers and the slits, when the left eye is at the position illustrated in FIG. 35B.

FIG. 42A schematically illustrates the relationship between the display panel 53 viewed from the left eye 90L, and the barriers BR and the slits SL, when the left eye 90L is at the position illustrated in FIG. 35A. FIG. 42B schematically illustrates the relationship between the display panel 53 viewed from the left eye 90L, and the barriers BR and the slits SL, when the left eye 90L is at an intermediate position between the position illustrated in FIG. 35A and the position illustrated in FIG. 35B and before the barrier lighting state is switched. FIG. 42C schematically illustrates the relationship between the display panel 53 viewed from the left eye 90L, and the barriers BR and the slits SL, when the left eye 90L is at an intermediate position between the position illustrated in FIG. 35A and the position illustrated in FIG. 35B and during the switching of the barrier lighting state. FIG. 42D schematically illustrates the relationship between the display panel 53 viewed from the left eye 90L, and the barriers BR and the slits SL, when the left eye 90L is at an intermediate position between the position illustrated in FIG. 35A and the position illustrated in FIG. 35B and after the barrier lighting state is switched. FIG. 42E schematically illustrates the relationship between the display panel 53 viewed from the left eye 90L, and the barriers BR and the slits SL, when the left eye 90L is at the position illustrated in FIG. 35B.

According to the present embodiment as well, the state in which luminance variation is small and crosstalk is low can be maintained over a period before and after the barrier lighting state is switched, i.e., over a period between the states illustrated in FIGS. 42A to 42E.

Figure 43:
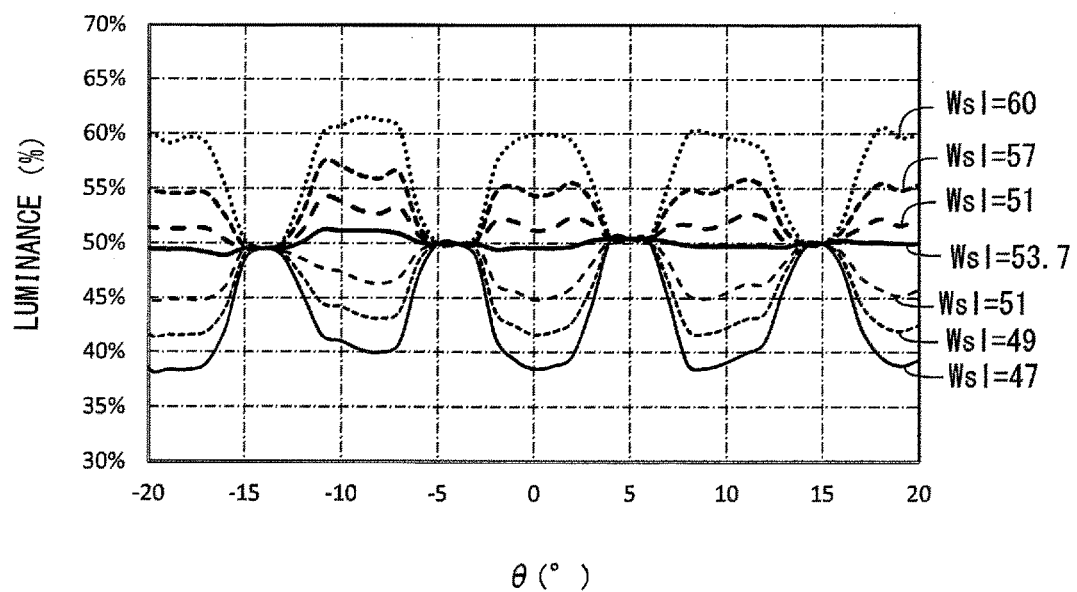
FIG. 43 is a graph illustrating angle characteristics of luminance when the width of the slit is changed.

FIG. 43 is a graph illustrating angle characteristics of luminance when the width Wsl of the slit is changed. More specifically, FIG. 43 illustrates angle characteristics of luminance when the width Wsl of the slit is varied in a stereoscopic display device wherein PP=53.7 µm, A=32.1 µm, and Pe=8.96 µm. The width Wbr of the barrier satisfies Wbr=2PP−Wsl.

As illustrated in FIG. 43, when the width Wsl of the slit is 53.7 µm, that is, Wsl=Wbr, the angle characteristics of luminance become flattest. Therefore, it is preferable to set the width Wsl of the slit and the width Wbr of the barrier equal to each other.

[The Third Embodiment]

Figure 44:
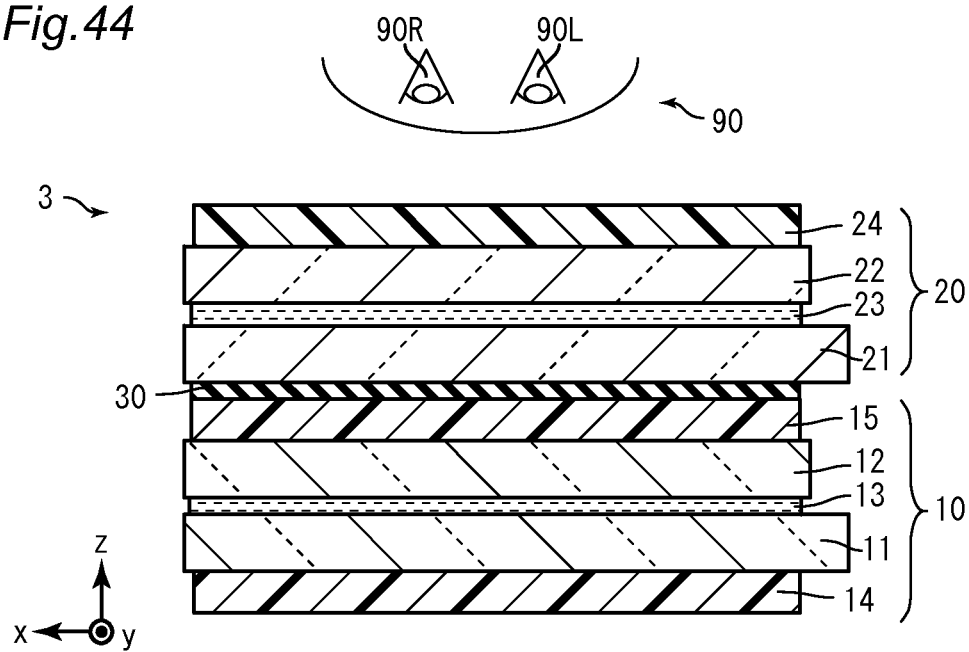
FIG. 44 is a schematic cross-sectional view illustrating a configuration of a stereoscopic display device according to the Third Embodiment of the present invention.

FIG. 44 is a schematic cross-sectional view illustrating a configuration of a stereoscopic display device 3 according to the Third Embodiment of the present invention. Compared with the stereoscopic display device 1, the stereoscopic display device 3 is different from the same regarding the relationship between the display panel 10 and the switch liquid crystal panel 20. In the stereoscopic display device 3, the switch liquid crystal panel 20 is arranged on the viewer 90 side with respect to the display panel 10. Regarding the switch liquid crystal panel 20, the polarizing plate 24 is arranged on a side opposite to the side of the display panel 10.

Figure 45A:
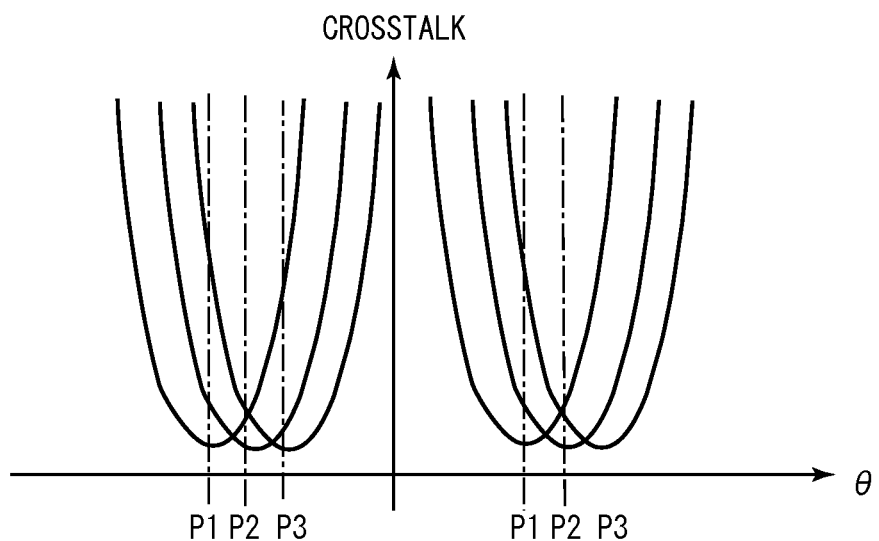
FIG. 45A illustrates angle characteristics of crosstalk when the barrier lighting state is changed, in the stereoscopic display device according to the First Embodiment of the present invention.
Figure 45B:
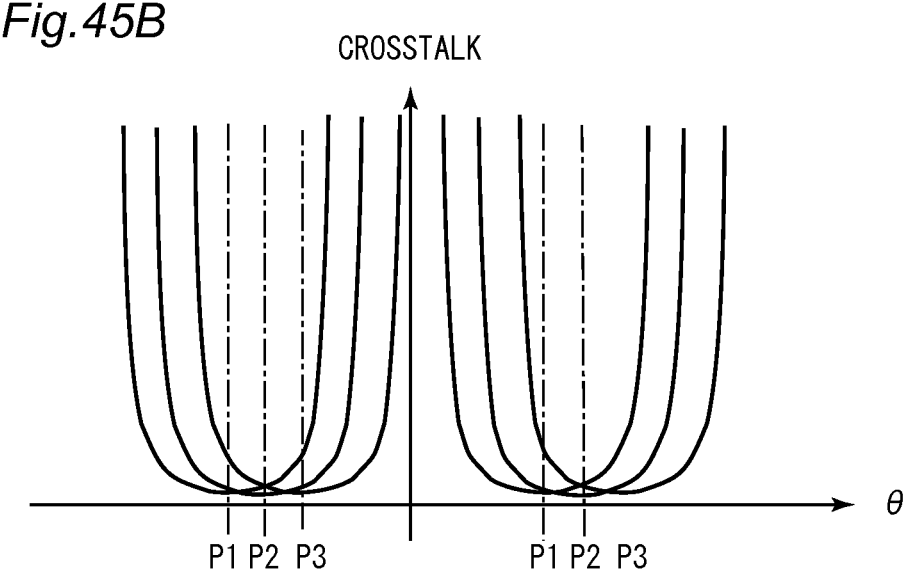
FIG. 45B illustrates angle characteristics of crosstalk when the barrier lighting state is changed, in the stereoscopic display device according to the Third Embodiment of the present invention.

FIG. 45A illustrates angle characteristics of crosstalk when the barrier lighting state is changed, in the stereoscopic display device 1. FIG. 45B illustrates angle characteristics of crosstalk when the barrier lighting state is changed, in the stereoscopic display device 3 according to the present embodiment.

According to the present embodiment, the arrangement of the switch liquid crystal panel 20 on the viewer side enables to reduce internal scattering that occurs when light passes through the display panel 10, and influences of diffraction. Therefore, crosstalk can be reduced further. This makes it possible to cope with stereoscopic images with contrast, in which crosstalk is more visible, and to quick actions of the viewer.

[Other Embodiments]

The foregoing description describes embodiments of the present invention, but the present invention is not limited to the embodiments described above, and may be varied in many ways within the scope of the invention. Further, the embodiments can embodied in combination appropriately.

In the embodiments mentioned above, examples are described in which a liquid crystal display panel is used as the display panels 10, 50, 52, and 53. However, an organic EL (Electroluminescence) panel, a MEMS (Micro Electric Mechanical System) panel, or a plasma display panel may be used in the place of the liquid crystal display panel.

INDUSTRIAL APPLICABILITY

The present invention is industrially applicable as a stereoscopic display device.

The invention claimed is:

1. A stereoscopic display device comprising:
a display panel for displaying an image with a plurality of pixels;
a switch liquid crystal panel that is arranged so as to be stacked on the display panel;
a position sensor for acquiring position information of a viewer; and
a control unit for moving a parallax barrier in which transmitting regions and non-transmitting regions are formed in periodic fashion in a predetermined alignment direction, in such a manner that the parallax barrier is moved in the predetermined alignment direction in accordance with the position information, with use of a predetermined barrier switching pitch as a minimum unit, and causing the switch liquid crystal panel to display the parallax barrier, wherein
the plurality of pixels have openings each of which has a width A in the alignment direction, the width A satisfying the following expressions:

$A \leq Wsl - 2Pe$, and $A \leq Wbr - 2Pe$ where Wsl is a width of the transmitting region, Wbr is a width of the non-transmitting region, and Pe is the barrier switching pitch,
the switch liquid crystal panel includes:
a liquid crystal layer;
a first substrate and a second substrate that are opposed to each other with the liquid crystal layer being interposed therebetween; and
a first electrode group that is defined on the first substrate, and includes a plurality of electrodes that are arranged in the alignment direction, the plurality of electrodes having a width equal to each other.

2. The stereoscopic display device according to claim 1, wherein the control unit causes the parallax barrier to be displayed on the switch liquid crystal panel in such a manner that the width of the transmitting region and the width of the non-transmitting region are equal to each other.

3. The stereoscopic display device according to claim 1, wherein the switch liquid crystal panel further includes:
a common electrode that is defined on an approximately whole surface of the second substrate, wherein
the plurality of electrodes of the first electrode group are arranged in the alignment direction at an interval equal to the barrier switching pitch.

4. The stereoscopic display device according to claim 1, wherein the switch liquid crystal panel further includes:
a second electrode group that is defined on the second substrate, and includes a plurality of electrodes that are arranged in the alignment direction at an interval twice the barrier switching pitch, wherein
the plurality of electrodes of the first electrode group are arranged in the alignment direction at an interval twice the barrier switching pitch, and
the first electrode group and the second electrode group are arranged so as to be deviated with respect to each other by the barrier switching pitch in the alignment direction.

5. The stereoscopic display device according to claim 4, wherein, in accordance with the position information, the control unit drives a part of the electrodes included in one electrode group selected from the first and second electrode groups, whit a first phase, and drives the other electrodes with a second phase having a polarity opposite to that of the first phase.

6. The stereoscopic display device according to claim 4, wherein, in accordance with the position information, the control unit drives a part of the electrodes included in one electrode group selected from the first and second electrode groups, with a constant potential, and drives the other electrodes in such a manner that a polarity is reversed with respect to the constant potential at a predetermined cycle.

7. The stereoscopic display device according to claim 4, wherein, in accordance with the position information, the control unit drives a part of the electrodes included in one electrode group selected from the first and second electrode groups, in such a manner that a polarity is reversed with respect to a predetermined constant potential at a predetermined cycle, and drives the other electrodes with the predetermined constant potential.

8. The stereoscopic display device according to claim 1, wherein the switch liquid crystal panel is arranged on a side to the viewer with respect to the display panel.

9. The stereoscopic display device according to claim 1, wherein the display panel is arranged on a side to the viewer with respect to the switch liquid crystal panel.

10. The stereoscopic display device according to claim 1, wherein the display panel is a liquid crystal display panel.

* * * * *